(12) United States Patent
Wolverton et al.

(10) Patent No.: US 9,085,303 B2
(45) Date of Patent: Jul. 21, 2015

(54) VEHICLE PERSONAL ASSISTANT

(71) Applicant: SRI International, Menlo Park, CA (US)

(72) Inventors: Michael J. Wolverton, Mountain View, CA (US); William S. Mark, San Mateo, CA (US); Harry Bratt, Mountain View, CA (US); Douglas A. Bercow, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 8 days.

(21) Appl. No.: 13/678,213

(22) Filed: Nov. 15, 2012

(65) Prior Publication Data
US 2014/0136013 A1    May 15, 2014

(51) Int. Cl.
| | |
|---|---|
| *B60W 50/10* | (2012.01) |
| *B60W 50/08* | (2012.01) |
| *G10L 15/22* | (2006.01) |
| *B60K 35/00* | (2006.01) |
| *B60W 40/08* | (2012.01) |

(52) U.S. Cl.
CPC ............... *B60W 50/10* (2013.01); *B60K 35/00* (2013.01); *B60W 50/085* (2013.01); *G10L 15/22* (2013.01); *B60K 2350/10* (2013.01); *B60W 2040/089* (2013.01)

(58) Field of Classification Search
CPC  G10L 15/22; B60W 2040/089; B60W 50/10; B60W 50/085
See application file for complete search history.

(56) References Cited

U.S. PATENT DOCUMENTS

| | | | |
|---|---|---|---|
| 6,037,976 | A  | 3/2000 | Wixson |
| 6,742,021 | B1 | 5/2004 | Halverson et al. |
| 6,757,718 | B1 | 6/2004 | Halverson et al. |
| 6,859,931 | B1 | 2/2005 | Cheyer et al. |
| 7,069,560 | B1 | 6/2006 | Cheyer et al. |
| 7,302,383 | B2 | 11/2007 | Valles |
| 7,835,578 | B2 | 11/2010 | Cheng et al. |
| 2001/0017632 | A1 | 8/2001 | Goren-Bar |

(Continued)

FOREIGN PATENT DOCUMENTS

| | | |
|---|---|---|
| EP | 1855186 A2 | 11/2007 |
| WO | 2011028842 A2 | 3/2011 |
| WO | 2011028844 A2 | 3/2011 |

OTHER PUBLICATIONS

International Search Report for Application No. PCT/US2010/047584, dated May 18, 2011, 4 pages.

(Continued)

*Primary Examiner* — Thomas Tarcza
*Assistant Examiner* — Kevin Myhre
(74) *Attorney, Agent, or Firm* — Barnes & Thornburg LLP

(57) ABSTRACT

A vehicle personal assistant to engage a user in a conversational dialog about vehicle-related topics, such as those commonly found in a vehicle owner's manual, includes modules to interpret spoken natural language input, search a vehicle knowledge base and/or other data sources for pertinent information, and respond to the user's input in a conversational fashion. The dialog may be initiated by the user or more proactively by the vehicle personal assistant based on events that may be currently happening in relation to the vehicle. The vehicle personal assistant may use real-time inputs obtained from the vehicle and/or non-verbal inputs from the user to enhance its understanding of the dialog and assist the user in a variety of ways.

32 Claims, 7 Drawing Sheets

(56) References Cited

U.S. PATENT DOCUMENTS

| | | | |
|---|---|---|---|
| 2006/0064431 | A1 | 3/2006 | Kishore et al. |
| 2006/0259219 | A1* | 11/2006 | Wakiyama et al. ............ 701/36 |
| 2007/0099602 | A1 | 5/2007 | Kurlander et al. |
| 2007/0288439 | A1 | 12/2007 | Rappaport et al. |
| 2008/0262909 | A1 | 10/2008 | Li et al. |
| 2009/0164431 | A1 | 6/2009 | Zivkovic et al. |
| 2009/0204599 | A1 | 8/2009 | Morris et al. |
| 2009/0254539 | A1 | 10/2009 | Wen et al. |
| 2010/0145700 | A1* | 6/2010 | Kennewick et al. ............ 701/36 |
| 2010/0146559 | A1 | 6/2010 | Lee et al. |
| 2011/0172873 | A1* | 7/2011 | Szwabowski et al. .......... 701/30 |
| 2012/0016678 | A1 | 1/2012 | Gruber et al. |
| 2012/0245944 | A1 | 9/2012 | Gruber et al. |
| 2012/0313854 | A1 | 12/2012 | Senanayake et al. |

OTHER PUBLICATIONS

U.S. Appl. No. 13/314,965 to Yadgar, filed Dec. 8, 2011, 46 pages.

"Beyond Siri: The next frontier in User Interfaces, How virtual assistants are disrupting search and access to connected screens," Vision Mobile, Jun. 2012, 24 pages.

Zancanaro, et al., "A Discussion on Augmenting and Executing SharedPlans for Multimodal Communication," 7 pages.

Cheyer, et al., "A Unified Framework for Constructing Multimodal Experiments and Applications," 7 pages.

Hernandez, et al., "Dialoguing With an Online Assistant in a Financial Domain: The VIP-Advisor Approach," 10 pages.

Winarsky, et al., "The Future of the Virtual Personal Assistant," Mar. 25, 2012, 3 pages.

"What does it take for mobile personal assistant to "understand" us?" Jan. 5, 2012, 3 pages.

Dowding, et al., "Interleaving Syntax and Semantics in an Efficient Bottom-Up Parser," 7 pages.

Nissan USA commericial, available at http://www.youtube.com/user/nissanusa/featured?v=V9xFgyv8BJI.

U.S. Appl. No. 13/399,210 to Senanayake et al., filed Feb. 17, 2012, 40 pages.

U.S. Appl. No. 13/484,520 to Sawhney et al., filed May 31, 2012, 44 pages.

International Search Report for Application No. PCT/US2010/047588, dated May 2, 2011, 4 pages.

"Voice Interfaced Vehicle User Help," Proceedings of the Second International Conference on Automotive User Interfaces and Interactive Vehicular Application (AutomotiveUI 2010), Nov. 12, 2010, Pittsburgh, Pennsylvania, USA, (8 pages).

* cited by examiner

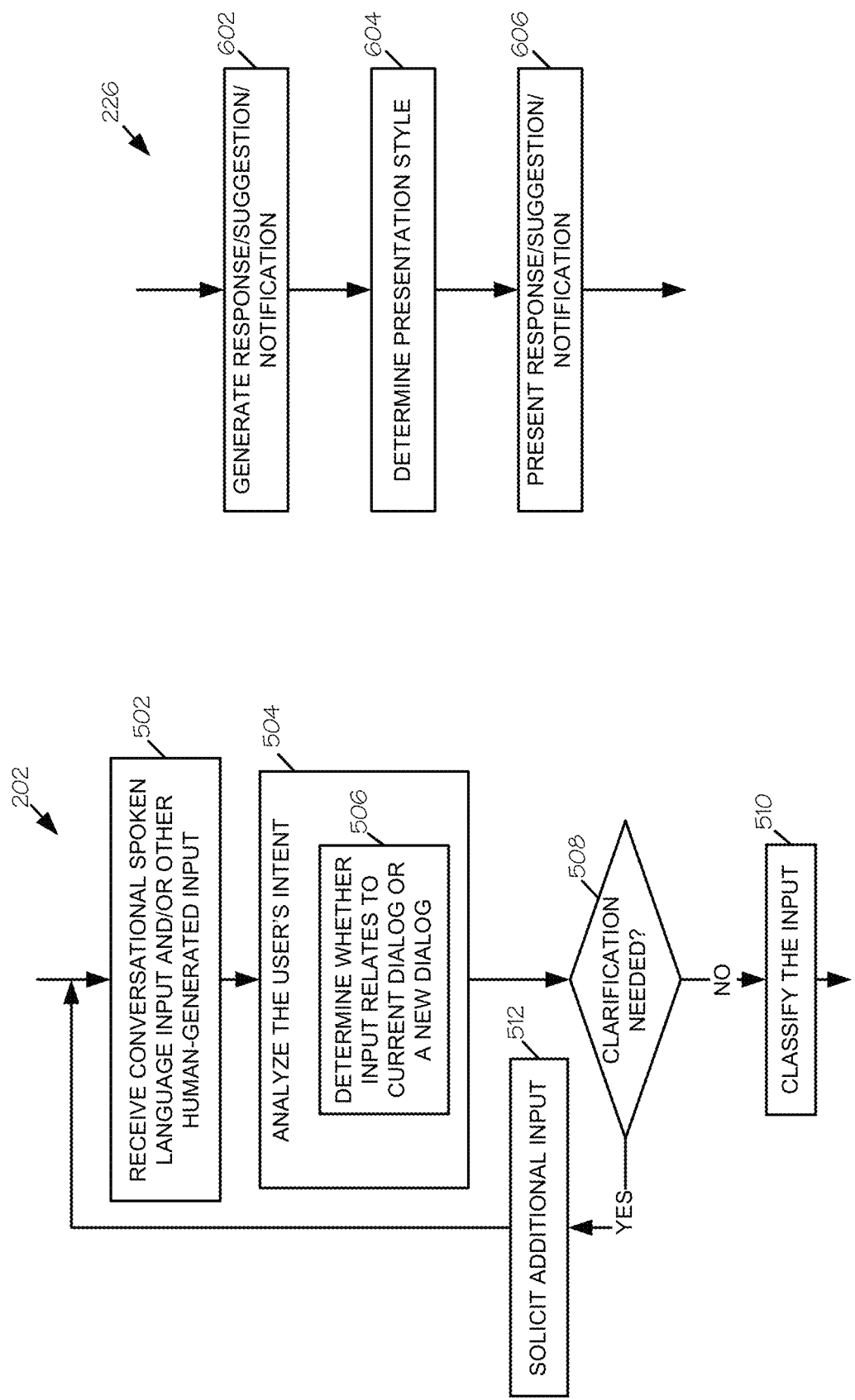

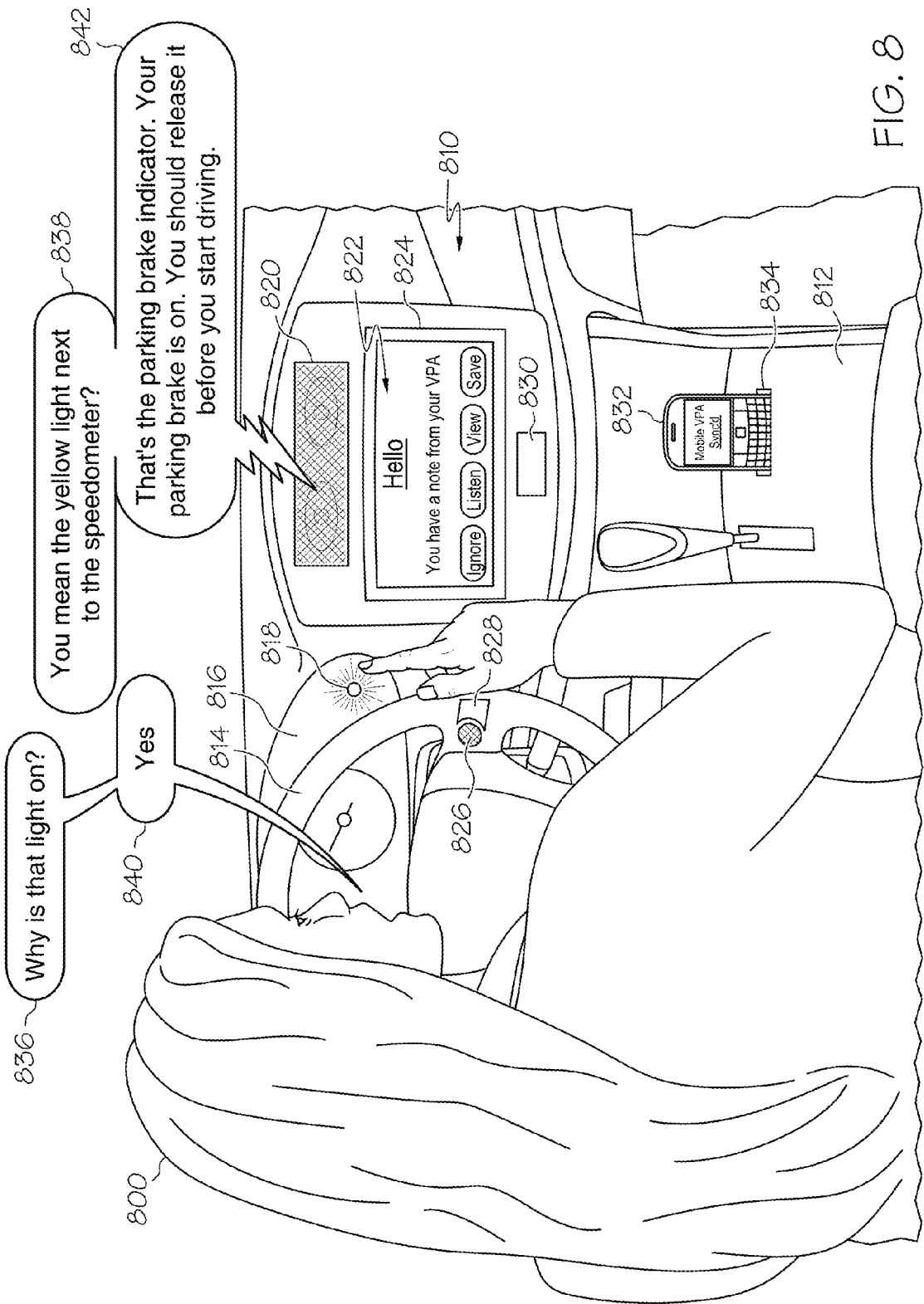

VEHICLE PERSONAL ASSISTANT

BACKGROUND

With advances in automotive technology and greater consumer sophistication, cars today are equipped with increasingly complex functions and features. Many people learn about these features by trial and error rather than by taking the time to thumb through the pages of a printed owner's manual or to look up information on the Internet. Another current option is to subscribe to a live call center-based service such as ONSTAR, but this can be expensive, particularly for simple questions or information requests. In short, the options available to drivers to understand the features of their vehicles have not kept pace with the technological complexity of today's cars. As a result, vehicle features that may be very helpful to a vehicle user may remain underused or not used at all.

SUMMARY

According to at least one aspect of this disclosure, a vehicle personal assistant embodied in one or more machine readable storage media is executable by a computing system to receive real-time sensor inputs relating to a current state of a vehicle; use one or more of the real-time sensor inputs to determine a current context of human activity in relation to the vehicle; and determine a style of presentation of output based on the current context.

The vehicle personal assistant may determine the current context by comparing the real-time sensor inputs to a vehicle-specific knowledge base. The real-time sensor inputs may include accelerating, braking and/or steering inputs. The vehicle personal assistant may determine the current context by comparing the real-time sensor inputs to a stored template. The vehicle personal assistant may compare the current context to a stored template and, based on the comparison, determine an aspect of driving behavior. The vehicle personal assistant may determine the output based on the aspect of driving behavior.

The vehicle personal assistant may determine the presentation style of the output based on the aspect of driving behavior. The vehicle personal assistant may determine the presentation style by comparing the real-time sensor inputs to a stored rule corresponding to the aspect of driving behavior. In the vehicle personal assistant, determining the style of the presentation of output may include selecting conversational spoken natural language, text, and/or recorded media. The vehicle personal assistant may present the output using the style of presentation.

According to at least one aspect of this disclosure, a vehicle personal assistant embodied in one or more machine readable storage media is executable by a computing system to monitor one or more real-time sensor inputs relating to the vehicle; compare the real-time sensor inputs to stored data corresponding to a vehicle-related condition to determine whether the real-time sensor inputs indicate that the vehicle-related condition has occurred; and in response to determining that the vehicle-related condition has occurred, initiate a real-time natural language conversation between the vehicle personal assistant and a person by presenting system-generated output comprising information about the vehicle-related condition.

The vehicle personal assistant may present machine-generated spoken natural language output at a speaker of the vehicle in response to determining that the vehicle-related condition has occurred. The vehicle personal assistant may display one or more of text, images, graphics, and video on a display of the computing system in response to determining that the vehicle-related condition has occurred. The vehicle personal assistant may present a suggested action to be performed by the person in relation to the vehicle in response to determining that the vehicle-related condition has occurred. The vehicle personal assistant may communicate data relating to the vehicle-related condition to another computing system in response to determining that the vehicle-related condition has occurred. The vehicle personal assistant may receive the real-time sensor inputs from a vehicle network of the vehicle.

The stored data may include a value associated with the occurrence of the vehicle-related condition, and the vehicle personal assistant may compare the real-time sensor inputs to the value. The stored data may relate to a user-specified driving situation associated with the occurrence of the vehicle-related condition, and the vehicle personal assistant may compare the real-time sensor inputs to the user-specified driving situation.

The vehicle personal assistant may receive human-generated input in response to the system-generated output and present further system-generated output relating to the conversation in response to the human-generated input. The vehicle personal assistant may receive human-generated input in response to the system-generated output and continue the conversation based on the human-generated input. The vehicle personal assistant may monitor the real-time sensor inputs and compare the real-time sensor inputs to the stored data while the vehicle is turned on. The vehicle personal assistant may access one or more third-party data sources to determine whether the real-time sensor inputs indicate that the vehicle-related condition has occurred.

According to at least one aspect of this disclosure, a vehicle personal assistant embodied in one or more machine readable storage media is executable by a computing system to receive real-time human-generated conversational spoken language input from a vehicle user. The real-time human-generated conversational spoken language input may include a vehicle-related triggering condition that may occur during the operation of the vehicle and an action to be performed by the vehicle personal assistant if the vehicle-related triggering condition occurs during the operation of the vehicle. The vehicle personal assistant is also executable to monitor one or more vehicle-related real-time sensor inputs; apply a vehicle-specific knowledge base to the real-time sensor inputs to determine whether the vehicle-related condition has occurred; and in response to determining that the vehicle-related triggering condition has occurred, execute the action. The vehicle personal assistant may apply the vehicle-specific knowledge base to the human-generated input to interpret the vehicle-related triggering condition.

The vehicle personal assistant may determine a current context based on the vehicle-related real-time sensor inputs and, in response to determining that the vehicle-related condition has occurred, present the system-generated output using a presentation style based on the current context. The vehicle personal assistant may determine the current context by comparing the vehicle-related real-time sensor inputs to a stored template. The vehicle personal assistant may compare the vehicle-related real-time sensor inputs to the vehicle-related condition while the vehicle is in operation. The vehicle personal assistant may receive the vehicle-related real-time sensor inputs from a vehicle network of the vehicle. The vehicle personal assistant may, in response to determining that the vehicle-related triggering condition has occurred, present machine-generated conversational spoken language output relating to the vehicle-related triggering condition.

The vehicle personal assistant may receive further human-generated input in response to the system-generated output and determine whether to modify the vehicle-related triggering condition based on the further human-generated input. The further human-generated input may include conversational spoken language input and/or non-verbal input. The vehicle personal assistant may present further system-generated output in response to the further human-generated input.

BRIEF DESCRIPTION OF THE DRAWINGS

This disclosure is illustrated by way of example and not by way of limitation in the accompanying figures. The figures may, alone or in combination, illustrate one or more embodiments of the disclosure. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 5 is a simplified flow diagram of at least one embodiment of a method by which the vehicle personal assistant of FIG. 1 may process conversational and other inputs generated by a person;

FIG. 6 is a simplified flow diagram of at least one embodiment of a method by which the vehicle personal assistant of FIG. 1 may provide output to a person;

FIG. 8 is a simplified perspective view of at least one embodiment of the vehicle personal assistant of FIG. 1 engaging in an exemplary conversational interaction with a vehicle driver.

DETAILED DESCRIPTION OF THE DRAWINGS

Figure 1:
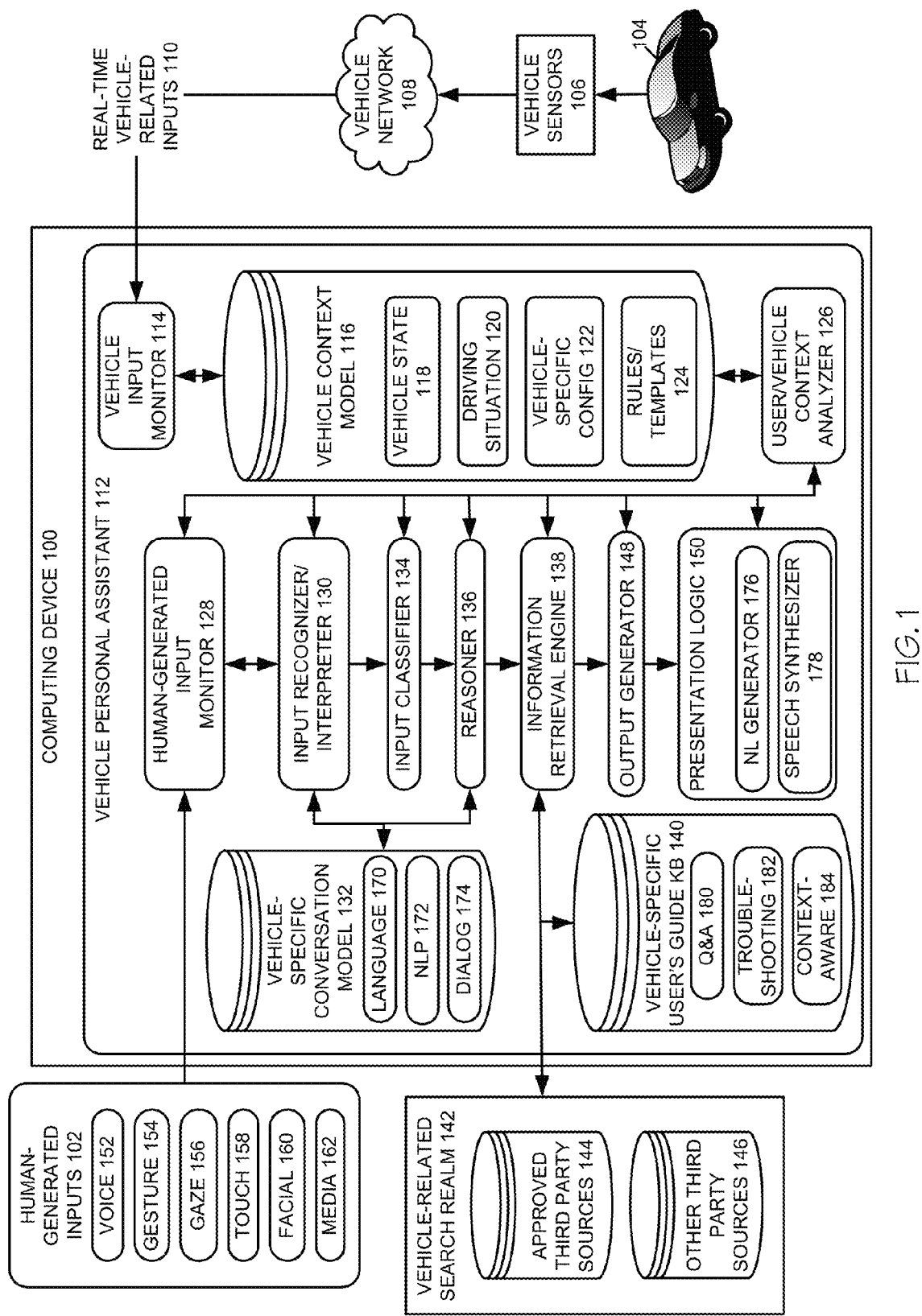
FIG. 1 is a simplified module diagram of at least one embodiment of a vehicle personal assistant, which, among other things, is capable of interfacing with a person, a vehicle network, and a vehicle-related search realm.

While the concepts of the present disclosure are susceptible to various modifications and alternative forms, specific embodiments thereof are shown by way of example in the drawings and are described in detail below. It should be understood, however, that there is no intent to limit the concepts of the present disclosure to the particular forms disclosed, but on the contrary, the intention is to cover all modifications, equivalents, and alternatives consistent with the present disclosure and the appended claims.

Referring to FIG. 1, a vehicle personal assistant 112 is embodied in a computing system 100 as computer software, hardware, firmware, or a combination thereof. As described in detail below, the computing system 100 or portions thereof may be embodied as an in-vehicle computing system (e.g., an "in-dash" system), a mobile computing device (e.g., a smart phone or tablet computer), other computing devices (e.g., desktop or server computers), or a combination of any of these. The vehicle personal assistant 112 can engage in a conversational dialog with a person, such as a driver or occupant of a vehicle 104, relating to a variety of components and features of the vehicle 104. By "conversational dialog," we mean that the vehicle personal assistant 112 can engage in one or more communicative exchanges (e.g., a dialog with multiple rounds) with a person in relation to a vehicle-specific topic, feature, component or event. As such, the vehicle personal assistant 112 can determine whether current input from a person relates to a current or previous round of the same conversation or constitutes the beginning of a new conversation. Various embodiments of the vehicle personal assistant 112 are configured so that the dialog can be initiated either by the person or in a proactive, autonomous manner by the vehicle personal assistant 112.

The vehicle personal assistant 112 intelligently considers human-generated inputs 102 as well as, in some cases, real-time vehicle-related inputs 110. The inputs 110 are generated by or derived from vehicle sensors 106 from time to time during operation of the vehicle 104, and are made available to the vehicle personal assistant 112 by a vehicle network 108. The real-time vehicle-related inputs 110 are automated in the sense that overt action by the user of the vehicle personal assistant 112 is not required in order for the inputs 110 to be generated by the vehicle 104 and made available to the computing device 110 by way of the vehicle network 108.

By "intelligently," we mean that the vehicle personal assistant 112 can apply automated artificial intelligence classification and/or reasoning techniques, for example, to resolve ambiguous, conflicting, and/or voluminous inputs 102, 110 and to facilitate conversational interaction between a person and the vehicle personal assistant 112. Through its intelligent analysis of the inputs 102, 110, the vehicle personal assistant 112 can determine or "infer" a likely current context of a dialog in which it is engaged with a person in order to improve its understanding of the person's goal or intent with respect to the dialog.

A number of different human-generated inputs 102 may be involved in a dialog between a person and the vehicle personal assistant 112. Generally, the vehicle personal assistant 112 processes and responds to conversational spoken natural language (voice) inputs 152, but it may consider other input forms that may be generated by the user, alternatively or in addition to the voice inputs 152. Such other forms of human-generated inputs 102 may include gestures (e.g., body movements) 154, gaze (e.g., location and/or duration of eye focus) 156, touch (e.g., pressing a button or turning a dial) 158, facial features or expressions (e.g., whether the user appears alert, sleepy, or agitated) 160, media (e.g., text, photographs, video, or recorded sounds supplied by the user) 162, and/or others. Generally speaking, the inputs 102 may include any variety of human-initiated inputs. For example, the inputs 102 may include deliberate or "active" inputs that are intended to cause an event to occur at the computing system 100 (e.g., the act of touching a button control or saying a specific voice command). The inputs 102 may also include involuntary or "passive" inputs that the user may not expressly intend to result in a system event (such as a non-specific vocal or facial expression, tone of voice or loudness).

The vehicle personal assistant 112 applies automated speech recognition, natural language processing, and/or other artificial intelligence-based methods, for example, to interpret the human-generated inputs 102 and determine the user's likely goal or intent with regard to his or her current interaction with the vehicle personal assistant 112. Based on its analysis of the inputs 102 (which may be informed by the real-time vehicle related inputs 110), the vehicle personal assistant 112 looks for relevant information in a vehicle-specific user's guide knowledge base 140 and/or a vehicle-related search realm 142.

The vehicle-related search realm 142 refers to a body of digital content that may be stored on the computing system 100 and/or other computing devices. The vehicle-related search realm 142 may include approved third party sources 144 (e.g., a vehicle manufacturer's authorized web site or other web sites that have been officially sanctioned by the manufacturer) and/or other third party sources 146 (e.g., "unofficial" sources such as YOUTUBE videos, vehicle-related blogs, TWITTER feeds, and the like). As such, the vehicle-related search realm 142 may include data sources that are accessible by the computing system 100 via a network (e.g., the Internet) alternatively or in addition to data sources that are more directly accessible or local to the computing system 100. In some cases, the vehicle-related search realm 142 may be limited to data sources that are associated with specific vehicle manufacturers or suppliers, while in other cases the vehicle-related search realm 142 may include a wide variety of Internet-accessible sources of content.

Based on the results of its search, the vehicle personal assistant 112 provides suitable output in a conversational, spoken natural-language manner, or employs another presentation style that it considers appropriate for the current context as gleaned from the inputs 102 and/or the real-time vehicle-related inputs 110. In these and other ways, the vehicle personal assistant 112 can enhance the driving experience by allowing the user to interact with vehicle-related sources of information 140, 142 in a natural, humanlike fashion that is convenient and appropriate for the vehicle context.

In more detail, the illustrative vehicle personal assistant 112 is embodied as a number of computerized modules and data structures, which include: a human-generated input monitor 128, a human input recognizer/interpreter 130, a vehicle-specific conversation model 132, an input classifier 134, a reasoner 136, an information retrieval engine 138, the vehicle-specific user's guide knowledge base 140, an output generator 148, presentation logic 150, a vehicle input monitor 114, a vehicle context model 116, and a context analyzer 126. It should be appreciated that these modules and data structures are defined as such for discussion purposes, and are not intended to imply that any specific implementation details are required. For example, any of these modules and data structures may be combined or divided into submodules, subprocesses or other units of computer code or data as may be required by a particular design or implementation of the vehicle personal assistant 112.

The human-generated input monitor 128 detects and receives human-generated inputs 102 from time to time during the operation of the vehicle personal assistant 112. The human-generated input monitor 128 may run continuously (e.g., as a background process), or may be invoked or terminated by a user on demand (e.g., by pressing a button control or saying a specific keyword). In other words, the vehicle personal assistant 112, and thus the human-generated input monitor 128, can be configured to monitor the inputs 102 irrespective of whether the vehicle personal assistant 112 is installed in the vehicle 104 and whether or not the vehicle 104 is in operation. Additionally, the user may choose whether to allow the vehicle personal assistant 112 to make use of certain of the human-generated inputs 102 but not others. For example, the user may allow the vehicle personal assistant 112 to monitor voice inputs 152 but not facial features or expressions 160.

The input recognizer/interpreter 130 converts the human-generated inputs 102 into a text or otherwise computer-readable format that can form the basis of a search for information. To process spoken natural-language input 152, the illustrative input recognizer/interpreter 130 may include standard (now existing or later-developed) speech recognition software, such as DYNASPEAK, available from SRI International. The speech recognition software may interface with a vehicle-specific language model 170 to analyze and convert the spoken input 152 into text-based words, word strings, phrases, or expressions (e.g., "chunks" or "sentences").

Some embodiments of the input recognizer/interpreter 130 may include a standard (now existing or later-developed) natural language processor. The natural language processor may apply syntactic, grammar, and/or semantic rules, which may be stored in an NLP portion 172 of the vehicle-specific conversation model 132, to the text produced by the speech recognition engine, to parse and/or annotate the text in order to better understand the user's intended meaning of the uttered speech. For example, the input recognizer/interpreter 130 may determine that a user has spoken the word "light" and that the user likely intends to refer to an indicator light that is currently blinking on the instrument panel of the vehicle 104, rather than a headlight or an interior dome light of the vehicle 104. The input recognizer/interpreter 130 may include a natural language understanding component, such as the GEMINI Natural-Language Understanding System, available from SRI International, for parsing and semantic interpretation. A toolkit such as the SRI Language Modeling Toolkit, available from SRI International, may be used to create portions of the vehicle-specific conversation model 132 (e.g., a statistical language model).

Some embodiments of the vehicle-specific conversation model 132 include a standard, general-language speech model (e.g., English, German, Japanese, etc.), while other embodiments additionally include a vehicle-specific or task-adapted vocabulary and ontology. That is, some embodiments of the vehicle-specific conversation model 132 include words and phrases that are commonly used by people to describe or ask about the various features, components, and functions of their vehicles, as well as semantic information that describes the meaning of those words and phrases, their properties, and relationships between or among the various words and phrases in the vocabulary. For example, while a typical owner's manual may refer to a "turn indicator" and a "fuel tank," the more common terms used by humans in conversation may be "turn signal" and "gas tank," respectively. In this case, the vehicle-specific conversation model 132 may contain links between the terms "turn indicator" and "turn signal," and "fuel tank" and "gas tank," respectively.

The vehicle-specific conversation model 132 may be adapted or customized based on user demographics or other criteria. For example, people in certain geographic regions of the world may refer to fuel as "petrol" rather than "gas" or "gasoline," and so the ontology may include associations among these terms. In some embodiments, standard (now existing or later-developed) artificial intelligence machine learning techniques, for example, may be employed by the vehicle personal assistant 112 to adapt the vehicle-specific conversation model 132 to the user's personal language style and preferences over time.

The illustrative vehicle-specific conversation model 132 also includes an acoustic model that is appropriate for the in-vehicle environment as well as other possible environments in which the vehicle personal assistant 112 may be used (such as a garage, a car wash, a line at a drive-thru restaurant, etc.). As such, the acoustic model is configured to account for noise and channel conditions that are typical of these environments, including road noise as well as background noise (e.g., radio, video, or the voices of other vehicle occupants or other persons outside the vehicle). Additionally, some embodiments of the acoustic model are configured for the speaking style (e.g., tone, intonation, pace, accent, etc.) associated with the demographics of the intended user, in terms of age, gender, or regionalisms, for example. This is not to say that a particularly sophisticated or complex acoustic model is required; rather, a standard (now existing or later-developed) high-bandwidth acoustic model is suitable in many embodiments.

To process other forms of human-generated inputs 102, the input monitor 128 includes similarly suitable software-based algorithms and methods. For example, gestures 154, gaze 156, touch 158, and facial features or expressions 160 can be captured and recorded by an in-vehicle camera (or multiple such cameras), which may be mounted, for instance, to a rearview mirror, steering wheel, dashboard, or sun visor of the vehicle 104. Standard (now existing or later developed) computer vision and image processing techniques can be used to analyze the recorded inputs 102 and produce semantically meaningful computer-readable information therefrom. Some examples of multi-camera sensor systems for user gaze tracking are described in U.S. patent application Ser. No. 13/158,109 to Senanayake et al., filed Jun. 10, 2011, and U.S. patent application Ser. No. 13/399,210 to Senanayake et al., filed Feb. 17, 2012. Some examples of suitable gesture recognition techniques include standard (now existing or later developed) real-time human action recognition methods, such as those that use two- or three-dimensional digital images or video, gesture recognition methods now embodied in commercially-available software such as FLUTTER APP (which uses a web cam), and/or others. Media 162 can also be analyzed using standard (now existing or later developed) image processing techniques. To derive meaning from such inputs 102, the vehicle-specific conversation model 132 may include a semantic model that associates high-level human language terminology with certain gestures 154, gaze 156, touch 158, and facial 160 inputs. Some techniques for deriving semantic information from digital media are described in Sawhney et al., U.S. patent application Ser. No. 13/484,520, filed May 31, 2012. Some additional examples of digital media analysis methods and techniques are described in Cheng et al., U.S. Pat. No. 7,835,578 (analyzing video and automatically generating semantic descriptions) and Wixson, U.S. Pat. No. 6,037,976 (determining ambient conditions such as fog, haze, etc., from images or video).

In the vehicle context, multiple different forms of inputs 102 may occur at the same time or in rapid succession. For example, the vehicle driver may be speaking and gesturing with one hand while his or her eyes are focused on the road ahead. Some embodiments of the vehicle personal assistant 112 may employ a multi-agent software framework or similar software architecture, in which multiple software agents are used to handle the various streams of inputs 102 that may be generated by the user. Some examples of such frameworks are described in Cheyer et al., U.S. Pat. Nos. 6,859,931 and 7,069,560.

In the vehicle context, efficient processing of the inputs 102 can be critical, as information requested by the user may only be relevant or desired during a short period of time. For example, a vehicle driver may simply give up on an inquiry if an answer is not received within a reasonable amount of time, particularly if his or her attention is focused on driving the vehicle. The input classifier 134 analyzes the computer-readable representations of the inputs 102 as prepared by the input recognizer/interpreter 130, and classifies the inputs 102 according to rules or templates that may be stored in the vehicle-specific conversation model 132 or the vehicle context model 116, described below.

Such classifications are, in general, based on the degree of specificity of the inputs 102 as well as the type of inquiry associated with the inputs 102. For example, direct, fact-based questions for which an answer can be provided fairly quickly (such as questions that have a yes or no answer, or "what is?" questions) may be classified differently than questions that require a more complicated explanation (such as "how-to" questions) or questions that are possibly ambiguous unless further information is obtained. The manner in which inputs 102 are classified may be used to determine whether a suitable response can be quickly found in the vehicle-specific user's guide knowledge base 140, or whether sources in the vehicle-related search realm 142 may need to be searched, alternatively or in addition to the knowledge base 140.

If the classifier 134 determines that an input 102 is "situation-aware;" that is, the input 102 may have a different meaning depending on the current context, the reasoner 136 considers the current context as determined by the context analyzer 126, described below, and incorporates the most likely relevant aspects of the current context into the interpretation of the input 102 to infer the user's most probable intended meaning of the input 102. To do this, the reasoner 136 applies a probabilistic or statistical model (using, e.g., Bayesian modeling), which may be stored in the rules/templates 124 portion of the vehicle context model 116 (described below). The probabilistic or statistical model includes data relating to the likelihood, probability, or degree of confidence or certainty with which particular inputs 102 are associated with particular meanings based on the context.

For example, certain inputs 102 may have a different meaning depending on whether the vehicle 104 is turned on or off, whether the user is situated in the driver's seat or a passenger seat, whether the user is inside the vehicle, standing outside the vehicle, or simply accessing the vehicle personal assistant 112 from a computer located inside a home or office, or even whether the user is driving the vehicle 104 at relatively high speed on a freeway as opposed to being stuck in traffic or on a country road. For instance, if the vehicle personal assistant 112 detects that it is connected to the vehicle 104 and the vehicle 104 is powered on, the reasoner 136 can obtain specific information about the vehicle 104 (e.g., the particular make, model, and options that are associated with the vehicle's VIN or Vehicle Identification Number). Such information can be obtained from the vehicle manufacturer and stored in a vehicle-specific configuration 122 portion of the vehicle context model 116. The reasoner 136 can supplement the inputs 102 with such information, so that any responses provided by the vehicle personal assistant 112 are tailored to the configuration of the vehicle 104 and omit inapplicable or irrelevant information (rather than simply reciting generic statements from the printed version of the owner's manual).

The reasoner 136 can also resolve inputs 102 that involve geospatial references, such as inputs 102 that refer to a vehicle instrument or indicator based on its location relative to a known reference point in three-dimensional space, or another discriminating characteristic, but without actually naming the item (e.g., "the dial just to the left of the navigation screen," or "the button with the wavy orange line"). To do this, the illustrative reasoner 136 obtains potentially relevant geospatial information from the vehicle-specific user's guide knowledge base 140 and reconciles the inputs 102 therewith based on a probabilistic and/or statistical model, to determine the most likely intended meaning of the inquiry and a suitable response thereto.

In some cases, of course, the reasoner 136 may not arrive with sufficient confidence at a determination of the meaning of the inputs 102 or a suitable response. In these instances, the reasoner 136 may ask the user for further clarification (e.g., by engaging in a question-and-answer spoken language dialog), or may consult other (e.g., non-verbal) inputs 102 to try to further clarify the intended meaning without bothering the user with a follow-up question or dialog. For example, the reasoner 136 may look to gesture 154 or gaze 156 inputs to help clarify the current intent of the user's voice inputs 152. In these and other ways, the reasoner 136 increases the likelihood that any responses provided by the vehicle personal assistant 112 are appropriate and relevant to the user's current intended meaning and goal of the inputs 102.

Some embodiments of the reasoner 136 may include a standard (now existing or later-developed) spoken dialog manager module, which keeps track of the current state and flow of each conversation or dialog that occurs between the user and the vehicle personal assistant 112. The dialog manager module may interface with a dialog portion 174 of the vehicle-specific conversation model 132, to apply dialog-managing rules, templates, or task flows, for example, to the input 102 that are appropriate for the vehicle context. For example, the dialog model 174 may include vehicle-specific rules for determining when a conversation has started or ended, or for determining whether a current input 102 is related to other inputs 102. Such other inputs may include inputs 102 that have been received in one or more prior rounds of the same dialog and/or inputs 102 that have been received around the same time as the current input 102, and may include one or more non-verbal inputs 154, 156, 158, 160, and/or 162. As an example, in the vehicle context, a rule for determining whether a conversation has ended may allow for longer pauses between portions of a user's input 102, based on the likelihood that the user's attention to the dialog may be interrupted by the need to focus on the driving situation.

Further, the dialog model 174 may include rules for determining when to generate a response to user input 102, or for determining whether an input 102 is related to any recently-received real-time vehicle-related inputs 110. As an example, the dialog model 174 may include a rule that a new input 102 is related to a previous input 102 if it contains at least one common word or if it is received within a predefined period of time after the first input 102. Along the same lines, the dialog model 174 may include a rule that an input 102 is the start of a new dialog if the input 102 contains a word that was not present in previous inputs 102 and is not a synonym or abbreviation of any word in the previous inputs 102, or if the input 102 is received after a predefined period of time has elapsed since the last input, or if the input 102 includes a specific utterance by the user, such as "this is a new question."

The information retrieval engine 138 executes a search based on the key aspects of the interpreted, classified, and context-enhanced (as needed) inputs 102. In some cases, execution of a search by the engine 138 may simply involve finding one or more pre-defined question-and-answer pairs in the knowledge base 140 that most closely match the processed input 102. Alternatively or in addition, the information retrieval engine 138 may include a query generation module, which formulates a computer-executable search query based on the interpreted, classified, and context-enhanced (as needed) inputs 102. In some embodiments, a standard (now existing or later developed) bag-of-words model is used to develop the query based on the processed inputs 102. Standard (now existing or later developed) query expansion, stemming and/or stop-word removal methods may be employed to further refine or develop the search query. Query expansion may involve, for example, resolving technical terms and acronyms such as ABS (anti-lock braking system).

The engine 138 may execute one or more search algorithms across the vehicle-specific user's guide knowledge base 140, the vehicle-related search realm 142, and/or portions thereof, using the search query. To do this, the illustrative engine 138 employs standard (now existing or later developed) techniques for querying and determining content similarity. For example, in some embodiments, the information retrieval engine 138 uses a combination of term frequency and inverse document frequency algorithms (e.g., a modified tf-idf algorithm), and/or semantic similarity computational techniques, to create and continuously update an index of words that appear to be most important to or favored by the user, and stores that index in the knowledge base 140. Thus, in some cases, the information retrieval engine 138 may only search the index and not the full body of available content 140, 142. Notwithstanding the potentially domain-specific query generation and query expansion features, the illustrative engine 138 is otherwise domain-independent and as such, can accommodate new or updated information about the vehicle 104 (e.g., if the vehicle-specific user's guide knowledge base 140 is updated or new third party sources 144, 146 are added to the vehicle-related search realm 142).

Referring in more detail to the vehicle-specific user's guide knowledge base 140, the knowledge base 140 is a computer-accessible data structure that may include one or more indexed or otherwise searchable stores of vehicle-related knowledge (e.g., databases, lookup tables, or the like), each of which contains or references data, arguments, parameters, and/or machine-executable algorithms that can be applied by the informational retrieval engine 138 to a search request (e.g., processed input 102 or a generated search query). The knowledge base 140 may include all of the content (and perhaps more) typically found in a vehicle owner's manual, including text, graphics, video, as well as conversational spoken natural-language representations of the text, graphics, and/or video found in the vehicle owner's manual. For example, in some embodiments, the spoken natural-language representations include a collection of answering sentences, which correspond to common vehicle-related inquiries, and may be ranked or otherwise scored for relevancy in determining an appropriate response to an input 102.

The illustrative knowledge base 140 includes a set of common vehicle-related question and answer pairs 180 that can be used to respond to direct, fact-based inquiries from the user. For example, vehicle users may be likely to ask questions about the vehicle's tires, and so the question and answer pairs may include a number of answering sentences associated with the words "tire" and "tires." Such answering sentences may include "the recommended tire pressure for the front tires is 33 psi" and "the tires should be rotated every 5,000 miles."

The knowledge base 140 also includes a trouble-shooting portion 182, which includes annotations or tags that identify portions of the user's guide that likely relate to troubleshooting, such as explanations that are likely to be useful when something goes wrong in the vehicle and information about vehicle features that might be confusing to vehicle users. This may include information about certain features of the vehicle that may be non-intuitive or confusing simply because they are used infrequently. For example, vehicle users may be likely to wonder about safety features such as window locks that prevent rear-seat windows from being rolled down, and thus, explanations of these features may be included in the trouble-shooting portion 182.

The trouble-shooting portion 182 may also include information that can be used to respond to "how-to" questions. For example, the user may start a dialog with a question, "how often should my tires be rotated?" to which the vehicle personal assistant 112 responds with an answering sentence "every 5,000 miles is recommended." Realizing that the user needs to rotate his or her vehicle's tires, the user may then ask, "how do I rotate the tires?" to which the vehicle personal assistant 112 responds with a more detailed explanation or interactive tutorial gleaned from the trouble-shooting portion 182, e.g., "move the left front wheel and tire to the left rear, the right front to the right rear, the left rear to the right front and the right rear to the left front." In this case, the dialog manager described above may insert pauses between each of the steps of the tutorial, to wait for affirmation from the user that the step has been completed or to determine whether the user needs additional information to complete the task.

In some cases, the dialog manager may refer to real-time vehicle-related inputs 110 to determine if the user has performed the task correctly, and interrupt the dialog if the inputs 110 indicate that user has performed the task incorrectly. For example, a user may begin a dialog with the vehicle personal assistant 112 by asking why the indicator with exclamation point and slanted line is illuminated. The vehicle personal assistant 112 may respond by informing the user that the tire pressure is low in one of the tires. The user may then ask "which tire is low?" and the vehicle personal assistant 112 may refer to real-time inputs 110 to determine which tire has the low pressure and respond "the right front tire." If the user then proceeds to begin filling the left rear tire with air (as determined from the real-time inputs 110), the vehicle personal assistant 112 may then state that "it's the right front tire that needs air," with emphasis on the words "right" and "front."

The knowledge base 140 also includes "context-aware" rules and/or tags 184 that are associated with portions of the user's guide that are likely to be context-dependent, such as descriptions of elements on the instrument panel and information about features that are particularly context-sensitive (such as traction control or anti-lock braking systems). For instance, the context-aware portion 184 may include the geospatial tags mentioned above and/or associations of real-time inputs 110 with corresponding information in the user's guide. As an example, the context-aware portion 184 may include a table that maps real-time inputs 110 to vehicle features or components, or other words with which they may be associated (e.g., "tires: tire pressure" or "gas tank: fuel level" or "rain: traction control signal").

The knowledge base 140 may be supplied by the manufacturer of the vehicle in connection with the purchase of a car. In some cases, the knowledge base 140 may be part of a larger knowledge base of the vehicle manufacturer, to which the vehicle manufacturer grants access upon validation of the user. For example, the vehicle manufacturer may create and maintain (e.g., as a "cloud" service) a master knowledge base containing the requisite data for all of its vehicle models, of which the knowledge base 140 is a part.

Information contained in the vehicle-specific user's guide knowledge base 140 may be tailored to the specific make, model, and options of the vehicle 104. For example, if the vehicle 104 does not have heated seats, the knowledge base 140 may omit phrases such as "On vehicles that have heated seats," from answering sentences that are associated with questions about the operation of the vehicle seats. The illustrative vehicle-specific user's guide knowledge base 140 also includes metadata, geospatial tagging, and/or annotations to associate material in the knowledge base 140 with real-time inputs 110, and/or other tags or markups to enable effective searching and retrieval. Further, some embodiments of the vehicle-specific user's guide knowledge base 140 may include references or links (e.g., hyperlinks) to information posted at third party sources 144, 146 of the vehicle-related search realm 142. The knowledge base 140 may be configured for searching and sorting in a number of ways using currently available techniques (or similarly suitable later-developed techniques), such as machine-executable keyword, text, and/or meta data search algorithms, as discussed above.

In some embodiments, the vehicle-specific user's guide knowledge base 140 includes "high-level" human-understandable characterizations of the real-time vehicle-related inputs 110, so that the sensor data or other information obtained from the vehicle network 108 can be understood at the user's level and/or linked or associated with other data in the knowledge base 140, based on a common understanding of the data. In other embodiments, the vehicle context model 116, described below, stores, interprets, and/or otherwise manages such associations of real-time vehicle-related inputs 110 with high-level representations thereof. In some embodiments, portions of the vehicle-related search realm 142, such as the approved third party sources 140 and the other third party sources 142, may be indexed and searched in a similar manner and have a similar structure to the vehicle-specific user's guide knowledge base 140.

Once a search has been executed by the engine 138, the output generator 148 applies answer extraction techniques to score the search results using, e.g., statistical modeling, select one or more of the results, and extract the most relevant portions for presentation to the user. Alternatively, the output generator 148 may determine that none of the search results is similar enough to the search request. In that case, the output generator 148 may refine and re-execute the search query, ask the user for or analyze other (e.g., non-verbal) inputs 102, or simply report to the user that a suitable result has not been found (although that is typically the least desirable outcome).

Some suitable techniques for extracting a search result from a set of candidate results include those that are based on in-domain semantic similarity of the search query to the candidate results (e.g., the degree to which a question or phrase spoken by the user is semantically similar to a pre-formulated answering sentence). For instance, where a number of answering sentences may be relevant, the output generator 148 analyzes the statistical similarity of each of the candidate answering sentences to the input question or phrase (e.g., the search query), ranks the candidates based on the statistical similarity, and then selects the candidate or candidates with the highest ranking. Further, the output generator 148 may perform a similar analysis on the selected candidate, itself, so that only the most pertinent parts of the selected result are presented to the user. In this way, the output generator 148 endeavors to identify and produce content from the knowledge base 140 and/or the search realm 142 that is both concise and highly responsive to the inputs 102.

If the output generator 148 has identified output to be presented to the user, the presentation logic 150 interfaces with the context analyzer 126, described below, to determine a suitable presentation mode or style in which to present the output given the current context. The presentation logic 150 then formulates the output according to the selected presentation mode or style and presents the output to the user in that form. For example, if the output is to be presented in a (system-generated) natural-language format, a natural-language generator 176 may be used to generate a natural-language version of the computer-based representation of the output. Where the output is an answering sentence retrieved from the knowledge base 140, the natural-language generator 176 may not be needed. However, search results that are obtained from the vehicle-related search realm 142 may be translated into a natural-language form by the natural-language generator 176 if the presentation logic 150 determines that natural language is the appropriate or most desirable form in which to present the output. If the presentation logic 150 further determines that spoken natural-language is an appropriate form in which to present the output, a speech synthesizer 178 may be used to convert natural-language text generated by the natural-language generator 176 (or even the un-processed output) to speech (e.g., machine-produced speech using a human voice). Alternatively or in addition, the output may be visually presented (e.g., as text, graphics, or video) on a display screen of the computing system 100 or another display screen (e.g., a dash-mounted display screen inside a vehicle).

As noted above, the presentation logic 150 may vary characteristics of the output based on the current vehicle context. For example, the presentation logic 150 may vary the loudness with which the output is presented, according to the degree of road noise or the amount of noise inside the vehicle, as detected by the vehicle sensors 106. As another example, the presentation logic may formulate and present the output using graphics or video, which may be displayed on an in-dash display screen of the vehicle 104, if the vehicle transmission is in "Park" mode or if the vehicle speed is very slow (possibly indicating that the user is stuck in traffic), whereas a spoken language response may be selected, so as to minimize distraction to the driver, if the vehicle is traveling at a higher speed or along a curvy road. As a further example, if it appears to the context analyzer 126 (described below) that the user has been driving very slowly for a long period of time (possibly indicating that the driver may be frustrated at being stuck in traffic), the presentation logic 150 may vary the system-generated voice or speaking tone used to present the output (to, perhaps, have a calming effect on the driver) or change some other aspect of the presentation mode or style.

To illustrate one example of the operation of and interplay between the modules 128, 130, 134, 136, 138, 148, and 150, suppose that a person driving a vehicle asks the vehicle personal assistant 112, "What is that?" The human-generated input monitor 128 detects the speech input 152. The input recognizer/interpreter 130 recognizes the speech 152 as a question that probably relates to something that is currently happening in the vehicle 104. However, without additional information, the question is hard to answer. The input recognizer/interpreter 130 may interface with the user/vehicle context analyzer 126 to see if the current vehicle context can be used to help interpret the input 152, as described further below. In some cases, the input recognizer/interpreter 130 may solicit further clarification from the user by issuing a natural-language request for clarification. In other cases, the modules 136, 138, 148, 150 may proceed with an attempt to respond to the user's inquiry (with, perhaps, consideration of any applicable non-verbal inputs 102), and present a number of candidate responses or options from which the user may select the most relevant one.

Next, the input monitor 128 detects speech input 152 that says, "that light next to the speedometer, what is that?" The input recognizer/interpreter 130 interprets the words "light," "next to," and "speedometer." The input classifier 134 classifies the input 152 as a request for information. The reasoner 136 determines that this input 152 is related to the previously-received input, and thus the two inputs are related to the same dialog, based on the repeated use of the phrase, "what is that." Accordingly, the reasoner 136 determines that the best response is to identify the light next to the speedometer on the vehicle instrument panel for the user. The reasoner 136 uses geospatial tags in the knowledge base 140 to determine that the light the user is referring to is an indicator that the parking brake is turned on. Based on the first two rounds of the dialog having occurred in rapid succession, the output generator 148 determines that there is no need to repeat the "next to the speedometer" portion of the input 152 in the output, and selects as the best response a phrase that simply says, "that's the parking brake indicator." Given that the user is actively driving the vehicle 104, the presentation logic 150 may determine that synthesized spoken natural language output is the most appropriate mode for presenting the response, and present the response in that form.

Next, the modules 128, 130, 134 may identify speech input 152 that says, "why is that light on?" The reasoner 136 determines that this input 152 is a continuation of the same dialog about the parking brake indicator, based on the continued use of the words "that" and "light" by the user. The input classifier 134 classifies this input 152 as a "troubleshooting" inquiry based on the use of the word, "why." Accordingly, the information retrieval engine 138 is used to locate parts of the troubleshooting section 182 of the knowledge base 140 that relate to the parking brake. The output generator 148 extracts the phrase "your parking brake is on" from the knowledge base 140 and the presentation logic 150 presents this response to the user.

Next, the modules 128, 130 identify speech 152 that says, "how do I turn it off?" Here, the reasoner 136 determines that "it" relates to the previous rounds of dialog (e.g., the previous spoken inputs of the user) and associates "it" with the term, "parking brake." Based on the classifier 134's classification of the input 152 as a "how-to" question, the information retrieval engine 138 decides to search approved third party sources 144 in addition to the knowledge base 140, for an explanation that can be conveyed to the user in a manner that is appropriate for the current vehicle context. The output generator 148 extracts from the search results a step-by-step tutorial explaining how to turn the parking brake off while driving. The presentation logic 150 converts the tutorial to synthesized spoken natural language and presents the output to the user.

As indicated throughout the above discussion, the dialog between the vehicle personal assistant 112 and the user can be enhanced at different points by knowledge of the current vehicle context. The vehicle personal assistant 112 obtains information about the current context from the real-time vehicle-related inputs 110. Accordingly, the vehicle input monitor 114 monitors for and receives the real-time vehicle-related inputs 110 from the vehicle network 108. The inputs 110 may include raw sensor data generated by the vehicle sensors 106, such as electronic signals that indicate whether a particular indicator light is on or off, whether a particular vehicle feature is on, off, or not working normally (e.g., headlights, anti-lock braking, cruise control, etc.), the absolute fuel level in the fuel tank, various pressure readings (e.g., tire pressure, oil pressure, etc.), the outside temperature, compass readings, geographic location data, and/or others. The inputs 110 may, alternatively or in addition, include information that is calculated or determined by an in-vehicle computer and made available to the vehicle network 108 by the in-vehicle computer. Such values may include, for example, average vehicle speed, distance to empty fuel tank, collision detection information (e.g., whether the vehicle has experienced an impact), nearby obstacle distance (e.g., distance to nearest object as interpreted by a rearview backup camera), and/or other information.

In some embodiments, the vehicle input monitor 114 may be automatically launched by the vehicle personal assistant 112 when the vehicle personal assistant 112 detects that it is connected to a vehicle that is turned on. In other cases, the operation of the vehicle input monitor 114 may be invoked or terminated by an explicit action of the user; that is to say that the user may choose whether or not to allow the vehicle personal assistant 112 to make use of the vehicle-related inputs 110.

The vehicle input monitor 114 stores certain of the inputs 110 and/or information relating thereto in the vehicle context model 116. For example, in cases where the real-time vehicle-related inputs 110 include a steady stream of data over time, the vehicle input monitor 114 may apply programming logic to identify inputs 110 that appear to be of interest, and store only those inputs 110 in the vehicle context model 116. As an example, if an input 110 indicates that a particular indicator light on the instrument panel of the vehicle 104 has recently turned on after being off for a long period of time, the vehicle input monitor 114 may store this information in the vehicle context model 116. Additionally, as a result of such analysis, the vehicle input monitor 114 may associate a higher weight value or ranking with inputs 110 whose values have recently changed, so that those inputs 110 receive greater consideration by the context analyzer 126 in determining the current context.

The vehicle context model 116 is a computer-accessible data structure that stores real-time vehicle-related inputs 110 and/or other data relating thereto. As mentioned above, such other data may include high-level human-understandable characterizations of the inputs 110, which can be used to link the inputs 110 with information in the vehicle-specific user's guide knowledge base 140. As such, the vehicle context model 116 may include one or more indexed or otherwise searchable data stores (e.g., databases, lookup tables, or the like).

The vehicle context model 116 may be continuously or periodically updated by the vehicle input monitor 114. As such, at any given point in time, the vehicle personal assistant 112 may access the vehicle context model 116 to determine, for example, stored sensor data and/or derived or calculated data. For example, in some instances, a dialog between the user and the vehicle personal assistant 112 may require direct sensor data stored in the vehicle context model 116; while in other instances, calculated or derived data may be required. In some embodiments, the vehicle personal assistant 112 may utilize the real-time vehicle related inputs 110 directly; that is, without using the vehicle context model 116. Moreover, in some cases, the vehicle context model 116 may continue to store "outdated" inputs 110 and/or data relating thereto for a specified or predetermined amount of time. Such inputs 110 can enable the vehicle personal assistant 112 to respond to events or conditions that have occurred in the recent past, in addition to those that are currently happening.

Illustratively, the vehicle context model 116 contains a vehicle state portion 118, a driving situation portion 120, and a vehicle-specific configuration portion 122. The vehicle state portion 118 includes direct sensor data regarding, for example, the current operational state of the vehicle 104. Some examples of information that may be stored in the vehicle state portion 118 include the status of various indicator lights located on the vehicle 104's instrument panel, as well as other data indicating various aspects of the current operation of the vehicle 104, which are typically displayed on the instrument panel or another location in the near vicinity to the driver. Such data may include, for example, the current vehicle speed, acceleration, fuel tank status, cardinal direction (compass), inside and/or outside temperature, weather conditions, geographic location, time of day, and/or others.

The driving situation portion 120 may include calculated information that is often associated with the current driving situation, but which may not be displayed to the user in the vehicle cabin. Such information may include indications of changes in vehicle speed, changes in degree of turn of the steering wheel, frequency and/or intensity of braking, rate of fuel consumption, and/or other information. Such information may be used by the user/vehicle context analyzer 126 to make inferences about the user's current driving behavior or emotional state. For instance, a series of short accelerations and braking activity or sudden turns of the steering wheel may correspond to a template 124 for a fatigued, agitated or impaired driver. Such a template 124 may be paired with a corresponding rule 124 that suggests possible actions to be performed by the vehicle personal assistant 112 in response to the driver's current condition. Some possible responses of the vehicle personal assistant 112 may be to suggest that the driver pull over at the next rest stop and take a break, or call a loved one to come pick them up. In some embodiments, the vehicle personal assistant 112 may be programmed to go ahead and initiate some further action, e.g., make a phone call, send a text message, or post a social media update, if the user fails to respond to the suggestion and continues driving in the same manner. For example, the vehicle personal assistant 112 may be programmed to automatically contact a teenage driver's parents (e.g., by cellular phone or text message) if the driving situation does not change after a pre-defined period of time. As another example, wear and tear information relating to the driving situation may be recorded over time and stored or communicated to other computing systems for later use (e.g., for maintenance reminders).

Alternatively or in addition, the driving situation portion 120 may include other information that relates to the current driving situation but does not pertain directly to a feature or function of the vehicle 104. Such information may include exterior temperature, weather conditions, map, traffic, location, navigational information, or nearby venues. Such information may be obtained from a Global Positioning System (GPS) or from mobile device software applications, for example. The vehicle-specific configuration 122 may include the vehicle 104's specific make, model, and options information, as mentioned above.

The illustrative vehicle context model 116 also includes a rules/templates portion 124. The rules and/or templates 124 are used by the context analyzer 126 to interpret and determine the current context based on the real-time inputs 110 and/or other information stored in the portions 118, 120, 122 of the vehicle context model 116. For example, the rules and/or templates 124 may contain arguments or parameters to which the inputs 110 are compared, in order to determine an aspect of the current vehicle state or driving situation. Such a comparison may indicate, for example, whether the fact that a certain indicator light has turned on means that there is a serious problem with the vehicle 104, whether the user is currently speeding, or whether the user is stuck in traffic. Additionally, the rules and/or templates 124 may indicate appropriate suggestions that the vehicle personal assistant 112 may offer to the user based on the current context. For example, a rule may say that if the inputs 110 indicate that the vehicle 104 is approaching a school zone and the vehicle speed is more than 25 miles per hour, the vehicle personal assistant 112 may suggest that the driver slow down.

The rules and/or templates 124 are, at least initially, general in nature and based on determinations that have been previously made (through, e.g., historical data, research, crowd-sourcing techniques, etc.) about the meaning of the various real-time inputs 110. The rules and/or templates 124 may be determined according to a broad population of vehicle users, or set according to the user's demographic information and/or other pertinent factors. In some cases, the rules and/or templates 124 can be selected, configured and/or modified by vehicle manufacturer or the user, for example. Further, in some embodiments, automated machine learning techniques may be used to modify and adapt the rules and/or templates 124 over time, in accordance with the user's personal lifestyle or driving habits.

The user/vehicle context analyzer 126 interfaces with the vehicle context model 116 to determine various aspects of the current context based on the real-time vehicle-related inputs 110. That is, the context analyzer 124 compares the inputs 110 and/or other data stored in the portions 118, 120, 122 of the vehicle context model 116 to the rules and/or templates 124 to determine the current context of the vehicle and identify suggestions or actions that may be performed by the vehicle personal assistant 112 in response thereto. The context analyzer 124 provides the current context information to the modules 128, 130, 134, 136, 138, 148, 150 as needed. For example, the input monitor 128 may use the current context information to filter out certain of the user-generated inputs 102. The input recognizer/interpreter 130 may use the current context information to improve its understanding of the meaning of an input 102. The reasoner 136 may use the current context information to determine whether to ask the user to clarify an input 102. The engine 138 may use the current context information to expand or enhance the search query, or to determine which data sources 140, 142 to search with a search query. The output generator 148 may use the current context information to identify system-generated output that is likely to be the most relevant to the inputs 102. The presentation logic 150 may use the current context information to vary the presentation of the output, as discussed above. These examples represent just a few of the many ways in which the current context information provided by the context analyzer 126 can be used to enhance the dialog between the vehicle personal assistant 112 and the user.

Figure 2:
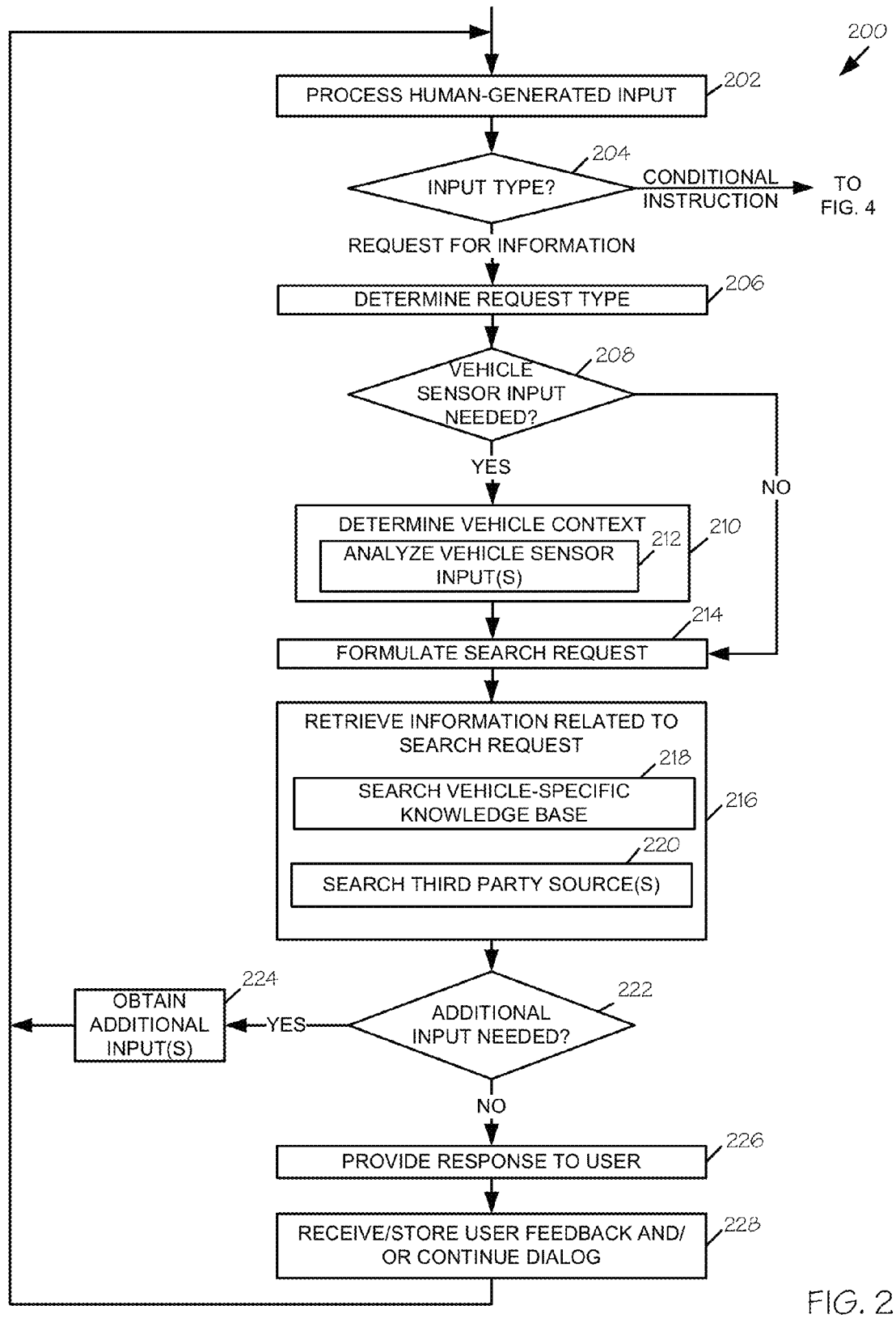
FIG. 2 is a simplified flow diagram of at least one embodiment of a method by which the vehicle personal assistant of FIG. 1 may engage in a conversational interaction with a person to provide information.

Referring now to FIG. 2, an illustrative method 200 executable as computerized programs, routines, logic and/or instructions by one or more of the various modules of the vehicle personal assistant 112 to enable a conversational dialog between a user and the vehicle personal assistant 112 is shown. At block 202, the method 200 receives and processes an input 102. In doing so, the method 200 determines the meaning, intent, and goal or objective of the input 102 in requesting a response from the vehicle personal assistant 112. Further details of block 202 are described below with reference to FIG. 5.

At block 204, the method 200 determines whether the input 102 most closely resembles a question to which an answer is sought (a "request for information") or a statement or command instructing the vehicle personal assistant 112 to do something (a "conditional instruction"). If the method 200 classifies the input 102 as an information request, the method 200 proceeds to block 206, at which the type of information request is determined. If the method 200 classifies the input 102 as a conditional instruction, an illustrative method 400 is performed. The method 400 is described below with reference to FIG. 4.

At block 206, the method 200 determines the type of information request that is being asked by the user. To do this, the method 200 may analyze the speech input 102, looking for "what," "when," "why," or "how" indicators. For example, if the input 102 begins with the word "what," or "how often" the method 200 may determine that the information request is for direct, factual information. If the input 102 begins with the word "why," or "how," the method may determine that the information request is for a more lengthy explanation of why a component is not working or a tutorial on how to turn a vehicle feature on or off. Alternatively or in addition, the input 102 may be classified as "context aware" if it is lacking certain specific details.

At block 210, the method 200 determines whether any real-time vehicle-related inputs 110 can be used to clarify the meaning of the input 102 or to respond to the input 102. If not, the method 200 advances to block 214, at which the method 200 formulates a search request without the use of any real-time vehicle-related inputs 110. If the method 200 determines that inputs 110 can be used to clarify the meaning of the input 102, the method 200 determines the current vehicle context at block 210. To do this, the method 210 analyzes the real-time vehicle-related inputs 110 and/or other information stored in the vehicle context model 116, at block 212, and compares such context information to pre-established rules and/or templates 124 as described above.

At block 214, the method 200 formulates a computer-executable search based on the (context-enhanced, as needed) input 102. As noted above, a bag-of-words model may be used, e.g., to parse the non-superfluous words of conversational spoken language input and generate a search query. Further, the method 200 may expand the input 102 to include, for example, synonyms, acronyms, and pseudo-synonyms. In other embodiments, more sophisticated query-generation methods may be employed. The specific format of the computer-executable query is largely dependent on the implementation technology. For example, the query may be generated using a special-purpose query language for relational databases (e.g., Structured Query Language (SQL), MySQL, etc.), a general programming language (e.g., C, C++, Java, Perl, etc.), and/or other technologies.

At block 216, the method 200 retrieves information related to the search request. In doing so, at blocks 218 and 220, the method 200 may search the vehicle-specific user's guide knowledge base 140 and/or one or more third party sources within the vehicle-related search realm 142 (e.g., the approved third party sources 140 and/or the other third party sources 142). The method 200 may determine which source (s) to utilize based on the context of the query. For example, if the user asks a question that may be answered by the vehicle owner's manual (e.g., "How often should I change my windshield wipers?"), the method 200 may primarily or exclusively consult or search the vehicle-specific user's guide knowledge base 140 for the answer. However, if the user asks a question that is beyond the scope of the owner's manual (e.g., "Should I use synthetic oil?"), the method 200 may search the third party sources 142 for the answer.

At block 222, the method 200 determines whether further clarification or additional information is needed from the user to provide a suitable response to the input 102. If the method 200 determines the further clarification is unnecessary, the method provides output to the user at block 226. Further details of block 226 are described below with reference to FIG. 6. If further clarification is needed, the vehicle personal assistant 112 prompts the user for clarification or otherwise obtains additional inputs 102, at block 224.

In some embodiments, the method 200 determines how to prompt the user for clarification based on the current vehicle context. For example, if the vehicle 104 is parked, the method 200 may prompt the user via spoken natural language, text, graphic, and/or video. However, if the vehicle 104 is moving fast or driving conditions are poor, the method 200 may opt to prompt the user for clarification and/or additional information using simple, clear, system-generated spoken natural language. Additionally, in some embodiments, the method 200 may consider whether the user is the driver or a passenger in determining how to prompt the user for clarification. The method 200 may similarly adapt its user prompts to other contexts. The method 200 then returns to block 202 to await continuation of the dialog, or the start of a new dialog, by the user.

At block 228, the method 200 may receive and store user feedback. For example, the method 200 may store or otherwise track the inquiries, requests, and/or responses of the user to the various outputs supplied by the vehicle personal assistant 112 over the course of a dialog. The method 200 may treat and interpret such feedback in the same manner as any of the human-generated inputs 102. That is to say, the user's feedback may be in any of the forms 152, 154, 156, 158, 160, 162 and/or other forms that can be processed by the vehicle personal assistant 112. In some cases, the method 200 may store feedback-related templates or rules in the vehicle-specific conversation model 132, for example, which the method 200 may use to interpret and determine the meaning of future inquiries, requests, and responses made by the user. The method 200 then returns to block 202 as described about. Thus, the method 200 can continue the vehicle-related dialog with the user in response to the user's feedback. It should be noted that for ease of discussion, blocks 210, 212, 226, and 228 of FIG. 2 may be repeated in FIGS. 3 and 4, where the features of those blocks are applicable to the methods 300, 400.

Figure 3:
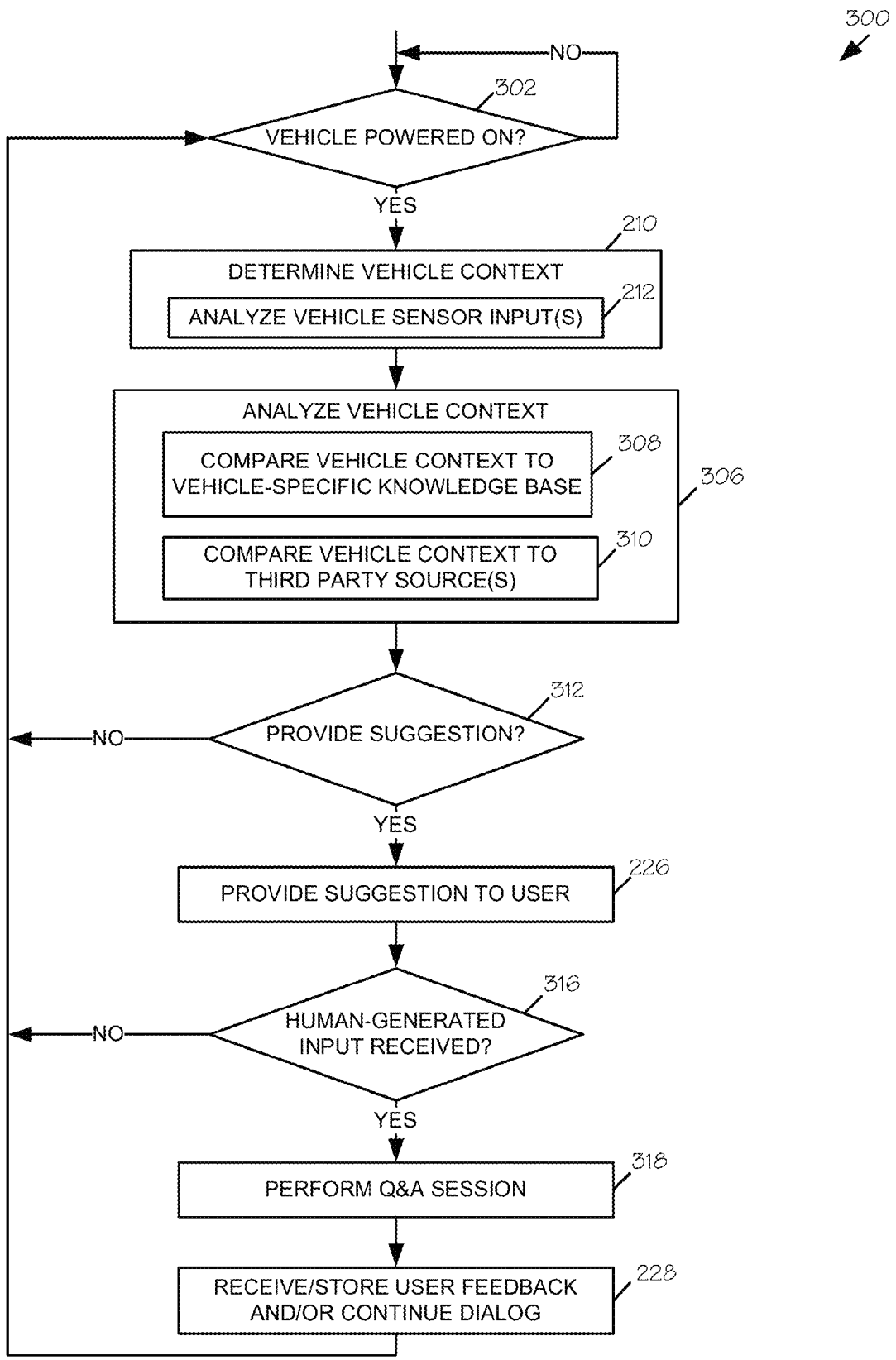
FIG. 3 is a simplified flow diagram of at least one embodiment of a method by which the vehicle personal assistant of FIG. 1 may proactively initiate a dialog with a person based on real-time vehicle-related inputs.

In some embodiments, the vehicle personal assistant 112 may proactively generate suggestions for the user based on the current vehicle context. Referring now to FIG. 3, an illustrative method 300 executable as computerized programs, routines, logic and/or instructions by one or more of the various modules of the system 100 in an autonomous or proactive fashion to initiate a dialog between the vehicle personal assistant 112 and the user, based on real-time vehicle-related inputs 110, is shown. At block 302, the method 300 determines whether the vehicle 104 is powered on (based on, e.g., one or more real-time vehicle-related inputs 110). If the method 300 determines that the vehicle 104 is powered on, the method 300 establishes or otherwise determines the current vehicle context at blocks 210, 212 as described above.

At block 306, the method 300 analyzes the vehicle context. In doing so, at block 308, the method 300 may compare certain aspects of the current vehicle context to portions of the vehicle context model 116 and/or the vehicle-specific user's guide knowledge base 140. Similarly, the vehicle personal assistant 112 may compare certain aspects of the vehicle context to information contained in or obtained from the third party sources 142, at block 310. As an example, inputs 110 may include exterior temperature and/or moisture readings. From the vehicle context model 116, the method 300 may determine that the inputs 110 indicate rain or fog. The method 300 may then consult the knowledge base 140 to look up information on how to turn on the vehicle's fog lights. Alternatively or in addition, and depending on the current driving context, perhaps, the method 300 may locate a video demonstration of how to use the fog lights in the third party sources 142. In this example, the method 300 may proceed to, in the subsequent blocks of the method 300, present a notification to the user to suggest that the fog lights be turned on. Of course, in some cases, the method 300 may not identify any information in any of the available sources that may be pertinent to the current context, in which case the method 300 simply continues monitoring the inputs 110 for changes to the current context.

At block 312, the method 300 determines whether suggestion or informational content has been identified at block 306 that appears to pertain to the current context. In doing so, the method 300 may consult a probabilistic or statistical model as described above, to determine the likely relevance of the identified content to the current context. If not, the method 300 returns to block 302 and continues monitoring the vehicle context while the vehicle is powered on (and as long as the vehicle personal assistant 112 is in use).

If, however, potentially context-relevant suggestion or informational content has been identified at block 306, the method 300 provides the output to the user at block 226, as discussed above in connection with FIG. 2. That is, the vehicle personal assistant 112 provides a proactive suggestion, notification, or informational message to the user based on the current context, at block 226. For example, the vehicle personal assistant 112 may offer a suggestion or reminder using system-generated conversational spoken natural language, based on a comparison of current conditions to information in the knowledge base 140, such as current temporal conditions (e.g., change oil every three months, change windshield wipers every six months, etc.) or sensor-specific conditions (e.g., tire air pressure, fuel level, etc.). Additionally, the vehicle personal assistant 112 may utilize the context model 116 and/or vehicle knowledge base 140 to provide suggestions related to matters that are more complex. For example, the vehicle personal assistant 112 may suggest that the user should accelerate more slowly if the inputs 110 indicate that traction control is turned on, or that the user should prepare to stop if the inputs 110 indicate that vehicle 104 is approaching a traffic light or stop sign.

At block 316, the method 300 determines whether the user has actively or passively responded to the output presented at block 226 (e.g., whether any additional inputs 102 have been detected). If so, the method 300 may continue the dialog by performing a question-and-answer session with the user at block 318. That is, upon receiving a suggestion from the vehicle personal assistant 112, the user may respond with a follow-up question or statement. For example, the vehicle personal assistant 112 may suggest, "You should change your transmission fluid," in which the user may respond "Why?" In such a circumstance, the vehicle personal assistant 112 may respond explaining, for example, "The vehicle owner's manual indicates that your transmission fluid should be changed every 30,000 miles," or "The fluid sensor indicates that your transmission fluid is too viscous or adulterated." In the fog light example above, the user may respond to the suggestion to turn on the fog lights with a question, "How do I turn on the fog lights?" to which the vehicle personal assistant 112 may respond, "Flip the switch to the left of the steering wheel."

At block 228, the method 300 may receive and store user feedback as discussed above in connection with FIG. 2. If the method 300 does not detect any input 102 at block 316 or after block 228, the method 300 returns to block 302 to continue monitoring the current vehicle context. The lack of a user response to the system-generated output of block 226 may also be noted and stored in computer memory, at block 228.

Figure 4:
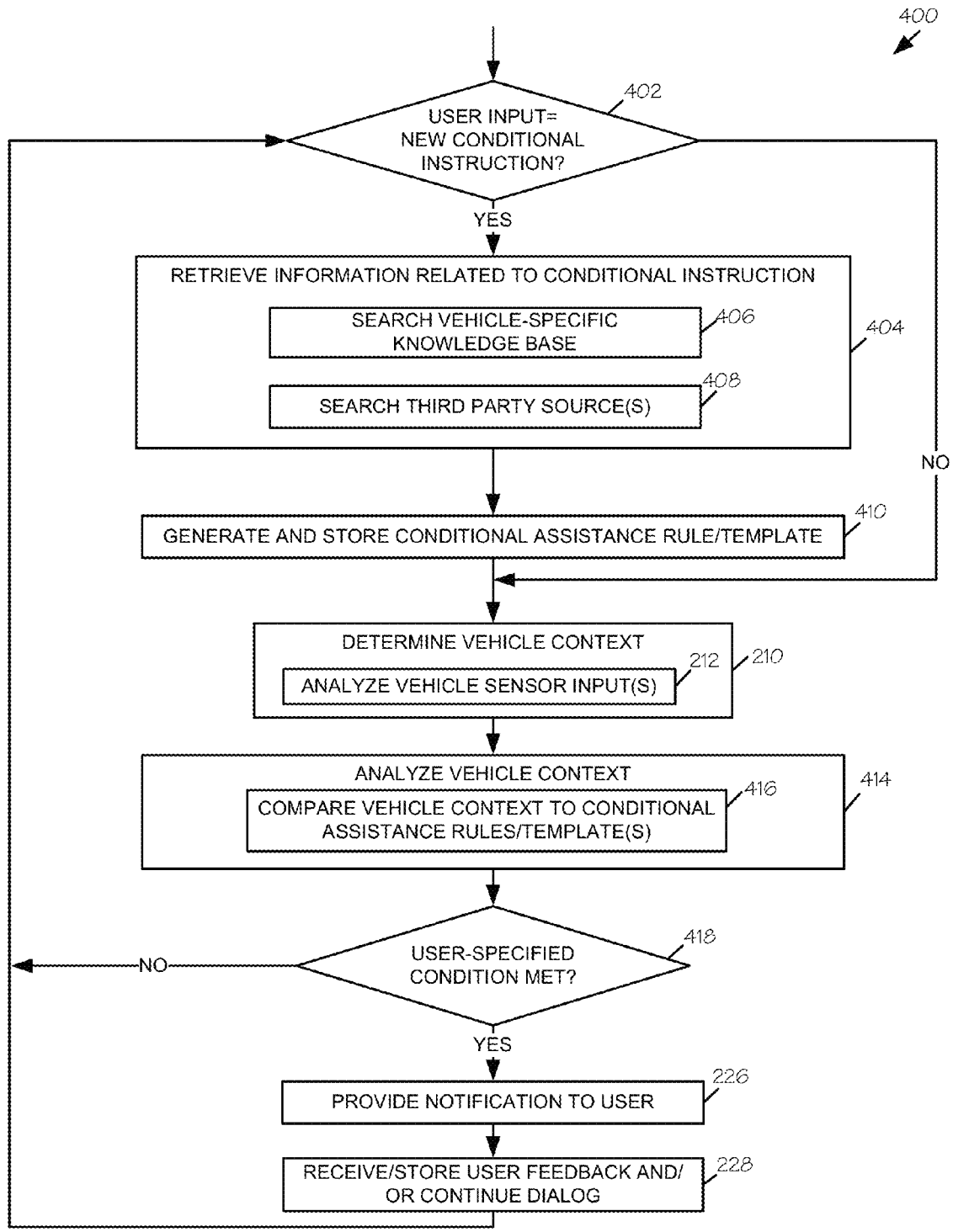
FIG. 4 is a simplified flow diagram of at least one embodiment of a method by which the vehicle personal assistant of FIG. 1 may proactively initiate a dialog with a person based on user input and vehicle-related inputs.

Referring now to FIG. 4, the method 400, which is executable as computerized programs, routines, logic and/or instructions by one or more of the various modules of the computing system 100 to proactively initiate a dialog with the user in response to task and/or condition-based user input 102 and real-time vehicle-related inputs 110, is performed. A human-generated input 102 may be classified as a conditional instruction at block 206 of FIG. 2, if the input 102 contains a task or condition and an action to be performed if the task or condition is satisfied. For example, the user may request the vehicle personal assistant 112 to "Tell me where the closest gas station is if I am running out of gas." In some embodiments, the vehicle personal assistant 112 may classify this spoken language input as a conditional instruction because there is both a condition (i.e., running out of gas) and an action associated with the condition (i.e., identify the nearest gas station).

In response to the conditional instruction, the method 400 may track the inputs 110 relating to the vehicle 104's fuel level and notify the user of the nearest gas station when the fuel reaches a certain level. To do this, the method 400 may interpret the phrase "running out of gas" as meaning "less than ⅛ of a tank" (based, e.g., on data or rules obtained from the vehicle-specific conversation model 132, the vehicle-specific user's guide knowledge base 140, or the vehicle context model 116). The method 400 may then monitor the vehicle sensors 106 that are associated with the vehicle 104's fuel level, and monitor the vehicle 104's navigation system (or a communicatively coupled Global Positioning System or GPS device, or a smart phone map or navigation application, for example). The method 400 may then present (e.g., by voice or graphic display) directions to the nearest gas station when the fuel level reaches one-eighth of a tank.

At block 402, the method 400 determines whether a new conditional instruction is being formulated. If a new conditional instruction is not being formulated, and the method 400 is just continuing to monitor the current context in view of a previously issued conditional instruction, the method 400 proceeds from block 402 to block 210 discussed above in connection with FIG. 2.

If a new conditional instruction is being formulated, the method 400 proceeds to block 404, at which it retrieves information related to the conditional instruction in order to interpret and implement the request. To do so, at block 406, the method 400 may search the vehicle-specific user's guide knowledge base 140 for information pertaining to the conditional instruction. Similarly, at block 408, the method 400 may, alternatively or in addition, search third party sources within the vehicle-related search realm 142, such as the approved third party sources 144 and/or the other third party sources 146. The method 400 may retrieve information related to the conditional instruction from these sources in a manner similar to which it uses to retrieve information in response to other (e.g., Q&A) inputs 102. However, rather than extracting an answer to a question from the vehicle knowledge base 140, the method 400 may extract data or information associated with the condition and/or action components of the conditional instruction. For example, if the user requests the vehicle personal assistant 112 to "Remind me when I need to change my transmission fluid," the vehicle personal assistant 112 may retrieve data indicating the preferred fluid change schedule for the vehicle 104 (e.g., every 30,000 miles) from the knowledge base 140. Additionally, vehicle personal assistant 112 may interpret "remind me" as requiring a spoken natural-language reminder, based on the vehicle-specific conversation model 132.

The method 400 then stores the interpreted conditional instruction in a manner that allows it to be checked as a condition against the current context. For example, the method 400 may periodically (e.g., each time the odometer reading changes) check whether the current odometer reading is a multiple of 30,000, and notify the user when such an event occurs. The method 400 may cause a condition flag to be set any time a user-specified condition is satisfied, and, when the condition flag is set, ask the user whether they wish to cancel or modify the conditional instruction. In some embodiments, the method 400 may determine whether to delete or renew a conditional instruction based on the conditional instruction itself. That is, the method 400 may determine whether the conditional instruction is intended to be a one-time request or an ongoing request requiring notification each time the condition occurs.

The method 400 may also store "action" data associated with the action to be performed by the vehicle personal assistant 112 when the conditional instruction is satisfied. For example, the method 400 may interpret "remind me" as requesting a spoken-language reminder if the vehicle is moving when the condition is satisfied and as a visual reminder if the vehicle is not moving, or the user is not in the vehicle, when the condition occurs. At block 410, the method generates and stores a template for the conditional instruction and the desired action or assistance to be performed by the vehicle personal assistant 112 when the condition is met. Such a conditional assistance template includes data associated with the conditional instruction (e.g., the condition and the action to be performed).

More generally, references herein to rules or templates are not meant to imply any specific implementation details. That is, the system 100 may store rules, templates, and/or data associated therewith in any suitable machine-readable format (e.g., structured as a rule or template). Moreover, conditional instructions need not be related to a feature or function of the vehicle 104. For example, the user may request the vehicle personal assistant 112 to "Remind me to pick up flowers for my wife on my way home from work." In such circumstances, the vehicle personal assistant 112 may monitor the inputs 110 and output a reminder to the user when the vehicle 104 approaches a flower shop on the user's route home from work.

At blocks 210 and 212, the method 400 determines the current vehicle context as discussed in connection with FIG. 2 above. At block 414, the method 400 analyzes the vehicle context. That is, the method 400 compares the current context of the vehicle 104 as determined by the context analyzer 126 to the conditional assistance templates, at block 416. More specifically, the method 400 determines which of the real-time vehicle-related inputs 110 provide the data that is needed to determine whether the user-specified condition is met, and determines the current values of those inputs 110.

At block 418, the method 400 determines whether a user-specified condition has been met. This can be done by analyzing the results of the comparison performed at block 414. For example, if the user-specified condition relates to a sensor input 110 reaching a specific "threshold" value (e.g., fuel level or odometer reading), the method 400 may determine whether the condition matches the threshold value within an acceptable, pre-established tolerance range.

If the condition is not met, the method 400 returns to block 402, at which the method 400 awaits another new conditional instruction or continues to monitor the current context for the occurrence of another previously specified condition. As such, the method 400 allows more than one conditional instruction to be formulated, stored, and monitored at the same time. If, at block 418, the method 400 determines that a user-specified condition has been met, the method 400 provides output to the user in the form of the user-requested action (e.g., a reminder or notification), at block 226. As discussed above with reference to FIG. 2, the vehicle personal assistant 112 may determine an appropriate presentation mode based on the vehicle context. At block 228, the method 400 receives and stores user feedback as described above in connection with FIG. 2. The method 400 then returns to block 402 to await a new conditional instruction or continue monitoring the current context for the occurrence of another previously specified condition.

It should be appreciated that the vehicle personal assistant 112 is capable of operating any combination of the methods 200, 300, and 400 (and indeed, the methods 500 and 600 described below) at the same time. That is, the vehicle personal assistant 112 may be continuously monitoring the inputs 110 for the occurrence of a pre-defined or user-specified condition all the while it is engaging in a conversational dialog with the user about another aspect of the vehicle 104. If a condition occurs that triggers an automated response by the vehicle personal assistant 112, standard (now existing or later developed) arbitration techniques can be used to determine whether the vehicle personal assistant 112 should interrupt its dialog with the user.

Referring now to FIG. 5, an illustrative method 500 executable as computerized programs, routines, logic and/or instructions by one or more of the various modules of the vehicle personal assistant 112 to process the human-generated input 102 (block 202 of FIG. 2) is shown. The method 500 processes the input 102 by receiving the input 102 from one or more of the sensors 106, at block 502. Any suitable sensor may be used to capture the user-generated inputs 102. For example, a microphone may be used to capture the user's voice 152; one or more cameras may be used to capture the user's gesture 154, gaze 156, and facial features or expressions 160; and pressure sensors may be used to capture the user's touch 158. Such sensors 106 may be mounted in the vehicle 104 or otherwise in communication therewith. In other words, the sensors 106 may be located outside the vehicle 104 (e.g., traffic light sensors) or in other electronic devices located in the vehicle 104 (e.g. mobile computing devices), for example. As discussed above, suitable speech recognition, natural-language processing, and/or image processing technology may be used to process the inputs 102.

At block 504, the method 500 analyzes the input 102 to determine the user's intended meaning thereof; e.g., the goal or objective in the user's mind at the time that the user generated the input 102, or the user's reason for providing the input 102. For example, the method 500 may determine: does the user want concise factual information (e.g., recommended motor oil), a more detailed explanation (e.g., a graphic showing where the oil dipstick is located), or a step-by-step tutorial (e.g., how to change the oil filter)? To do this, the method 500 may use standard (now existing or later developed) intent recognition and/or intent merging techniques, any of the techniques discussed above in connection with the input recognizer/interpreter 130, and/or other suitable methods. For example, the method 500 may extract words from the input 102 that appear to indicate a particular type of dialog: "what is" may be associated with a direct question and answer-type dialog; "how" or "why" may be associated with a how-to or trouble shooting-type dialog while "this" or "that" may be associated with a situation aware-type dialog. Particularly in situation-aware dialogs, adjectives (e.g., "wavy lines" or "orange") may be extracted and assigned a higher importance.

Additionally, the method 500 may undertake an effort to determine whether the input 102 represents a continuation of the current dialog, or the start of a new dialog, as described above. In either case, the method may further determine whether the input 102 represents a complete inquiry or an incomplete thought. The vehicle personal assistant 112 may receive input 102 that is incomplete if, for example, the driver's attention returns to the road ahead in the middle of an inquiry. In these instances, the method 500 may use standard (now existing or later developed) methods for addressing interrupted queries. For example, the method 500 may analyze the duration of the pause between inputs 102 and determine an appropriate response thereto. For pauses of longer duration, the method 500 may simply abandon the dialog and wait for the user to provide new input 102 at a later time. For pauses of shorter duration, the method 500 may issue a reminder to the user or prompt the user to continue the thought.

At block 508, the method 500 evaluates whether the input 102 is clear as to the user's intent and objectives. This evaluation may be based on, for example, a comparison of the current input 102 to previously-received inputs 102 and corresponding responses issued by the vehicle personal assistant 112 (e.g., search results). For example, if the current input 102 is similar to a previously-received input 102 to which the vehicle personal assistant 112 successfully responded (as determined, e.g., from verbal or non-verbal user feedback), the method 500 may conclude that the user's intent and objectives are well understood and no further clarification is needed. If the user's goal or intent is not clear from the input 102, the method 500 solicits additional input from the user at block 512 and returns to block 502. At block 510, the method 500 classifies the interpreted input 102 based on its substantive content. As mentioned above, the interpreted input 102 may be classified as an information request or a conditional instruction. As alluded to above, an information request may further be classified as a "direct" question, a "troubleshooting" question, or a "situation-aware query." An information request may be considered as a direct question if, for example, the user is trying to understand something about the vehicle 104 and wants a concise, direct answer (e.g., "what is the recommended tire pressure for the front tires?"). An information request may be classified as a "troubleshooting" question if, for example, the user is having a problem using a function or feature of the vehicle 104, or wants to know how to use a particular feature, and wants an explanation (e.g., "Why does only the driver side door unlock?" "Why won't my window stay up?" or "How do I set up the push-to-talk feature?"). An information request may be considered "situation-aware" if the input 102 relates to something that is currently happening or just recently happened in the vehicle 104 (e.g., "Why did the engine light just turn on?"). Further, an information request may be considered situation-aware if the input 102 may need to be clarified by the vehicle-related inputs 110 (e.g., "What does that light mean?" "What is that noise?" or "What just happened?").

The different types of information requests may be handled differently by the vehicle personal assistant 112. For instance, direct questions may be efficiently matched with a Q&A pair in the vehicle-specific user's guide knowledge base 140 (or an index thereof). "Troubleshooting" questions may require a deeper search of the knowledge base 140 and/or other sources 142, and may require a more involved response, such as a detailed explanation or tutorial. "Situation-aware" queries may require additional interpretation and/or reasoning using the real-time vehicle-related inputs 110 and/or other inputs 102, in order to determine the user's goal and intent, as described above.

Referring now to FIG. 6, an illustrative method 600 executable as computerized programs, routines, logic and/or instructions by one or more of the various modules of the vehicle personal assistant 112 to provide output to the user (block 224 of FIG. 2), is shown. At block 602, the method 600 generates a response or suggestion to be presented to the user, based on the information retrieved from the vehicle-specific user's guide knowledge base 140 and/or the vehicle-related search realm 142. To do this, the method 600 may review the results of an executed search query, score each of the potential responses or suggestions based on relevant domain information, and return the best match. In some embodiments, the method 600 may implement a threshold for scoring potential responses or suggestions such that the vehicle personal assistant 112 requests further input 102 if no potential responses or suggestions have scores exceeding that threshold. Further, the method 600 may review the contents of the selected response and extract out only the most relevant portions of the response for presentation to the user. For example, rather than reciting an entire paragraph out of the vehicle-specific user's guide knowledge base 140, the method 600 may extract the phrase or phrases that contain words that appear to be most responsive to the input 102.

At block 604, the vehicle personal assistant 112 determines an appropriate presentation mode or style for the response or suggestion as described above. For example, the method 600 may determine the appropriate presentation mode by comparing the current context to a rule or template 124. At block 606, the method 600 presents the response or suggestion to the user using the presentation mode selected at block 604.

IMPLEMENTATION EXAMPLES

Figure 7:
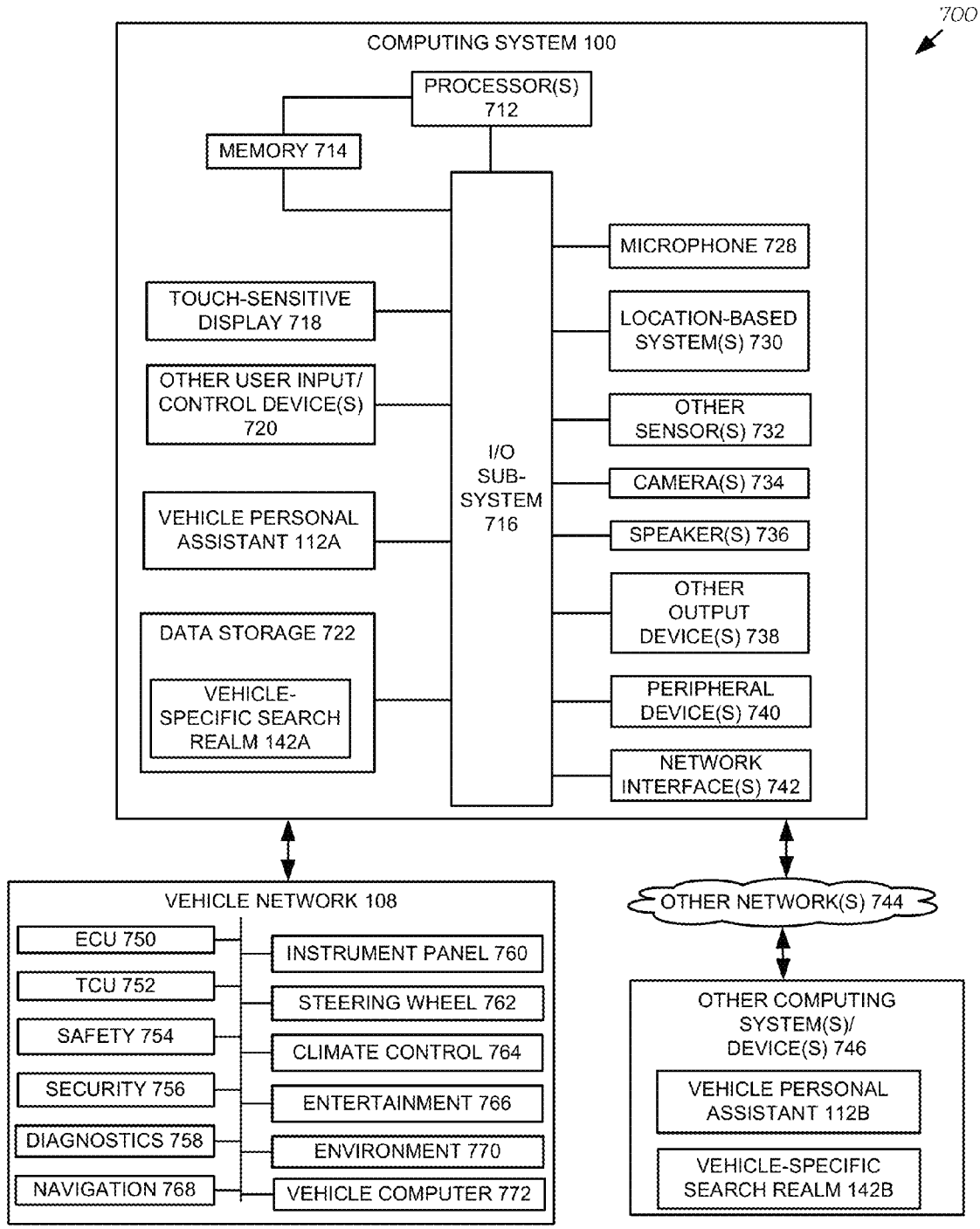
FIG. 7 is a simplified block diagram of an exemplary computing environment in connection with which at least one embodiment of the vehicle personal assistant of FIG. 1 may be implemented.

Referring now to FIG. 7, an exemplary computing hardware environment 700 including the computing system 100 is shown. While the computing environment 700 is shown as involving multiple components and devices, it should be understood that in some embodiments, the environment 700 or more particularly, the computing system 100, may constitute a single computing device (e.g., a mobile electronic device) alone or in combination with other devices. In other words, as used herein, the terms "system" and "environment" may refer to a single computing device or a combination of computing devices, networks, and/or other components.

The illustrative computing system 100 is in communication with the vehicle network 108 and, via one or more other networks 744 (e.g., a "cloud"), other computing systems or devices 746. Illustratively, a portion 112A of the vehicle personal assistant 112 is local to the computing system 100, while another portion 112B is distributed across one or more other computing systems or devices 746 that are connected to the networks 744. The portion 112B may include, for example, portions of the vehicle-specific conversation model 132, the vehicle-specific user's guide knowledge base 140, and/or the vehicle context model 116. Similarly, in the illustrative computing environment 700, a portion 142A of the vehicle specific search realm 142 is local to the computing system 100 while another portion 142B is distributed across the other computing systems or devices 746. In other embodiments, however, the vehicle personal assistant 112 and/or the vehicle specific search realm 142 may be located entirely on the computing system 100 or within a particular computing device thereof. Additionally, portions of the vehicle personal assistant 112 may be incorporated into other systems or interactive software applications. Such applications or systems may include, for example, operating systems, middleware or framework software, and/or applications software, such as more generalized virtual personal assistant applications.

The illustrative computing system 100 includes at least one processor 712 (e.g. a microprocessor, microcontroller, digital signal processor, etc.), memory 714, and an input/output (I/O) subsystem 716. In the illustrative embodiment, portions of the computing system 100 are embodied as an in-vehicle computing system. In other embodiments, the system 100 or portions thereof may be embodied as any type of computing device such as server, an enterprise computer system, a network of computers, a combination of computers and other electronic devices, or other electronic devices. For example, in other embodiments, portions of the system 100 may be embodied as a personal electronic device such as a mobile, portable, wearable or handheld computing device, smart phone, personal digital assistant, laptop computer, tablet computer, desktop computer, head-mounted device (e.g., goggles, glasses, earpiece, headset, etc.), implant, electronic contact, or other body-mounted device.

Although not specifically shown, it should be understood that the I/O subsystem 716 typically includes, among other things, an I/O controller, a memory controller, and one or more I/O ports. The processor 712 and the I/O subsystem 716 are communicatively coupled to the memory 714. The memory 714 may be embodied as any type of suitable computer memory device (e.g., volatile memory such as various forms of random access memory).

In the illustrative computing environment 700, the I/O subsystem 716 is communicatively coupled to a number of hardware components including: at least one touch-sensitive display 718 (e.g., a touchscreen, virtual keypad), a microphone 728, one or more other input or user control devices 720 (e.g., a physical keyboard or keypad, button, hard panel control, tactile or haptic interface), the vehicle personal assistant 112A, at least one data storage 722, one or more location-based systems 730 (e.g., GPS), one or more other sensors 732 (e.g., any of the sensors mentioned herein) and/or other sources of real-time inputs (e.g., a compass), one or more still and/or video cameras 734, one or more audio speakers 736, other output devices 738 (e.g., an LED, display screen, media player), one or more other peripheral devices 740 (e.g., sound, graphics or media adaptors), and one or more network interfaces 742.

The data storage 722 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.), the vehicle personal assistant 112A, and/or the vehicle-specific search realm 142A reside at least temporarily in the data storage 722. Portions of the systems software, the framework/middleware, the vehicle personal assistant 112A and/or the vehicle-specific search realm 142A may be copied to the memory 714 during operation, for faster processing or other reasons. Further, in some embodiments, portions of any of the systems software, the framework/middleware, the vehicle personal assistant 112A and/or the vehicle-specific search realm 142A may be specially configured for use in connection with a particular hardware platform or configuration, such as a particular implementation of an in-vehicle computing system or mobile device operating system.

A network interface 742 communicatively couples the computing system 100 to the vehicle network 108. The vehicle network 108 is an electronic communication network that is selected and configured by the vehicle manufacturer.

As such, the vehicle network 108 may include a Controller Area Network (CAN), a Local Interconnect Network (LIN), several of these, or a combination thereof. Generally speaking, electrical and electromechanical components of the vehicle 104, such as switches, relays, actuators, valves, solenoids, and the like, which operate the various features and functions of the vehicle 104, are controlled by a number of electronic control units or "nodes" of the vehicle network 108. The nodes communicate over the network 108 using a vehicle-appropriate data communication protocol, such as one of those defined by the Society of Automotive Engineers (SAE), e.g., SAE J1850 or SAE J1939. Each of the nodes may be embodied as a computing device having some components similar to those of the computing system 100 (e.g., a microcontroller, etc.). The sensors 106 detect the status of or changes in the operation of the various features and functions of the vehicle 104 and generate electronic signals in response thereto. The sensors 106 report such information to the respective nodes of the vehicle network 108 for analysis or diagnostic purposes, for display on the in-vehicle instrument panel, or for other purposes.

Illustratively, the vehicle network 108 includes the following nodes: an engine (or other drive unit) control 750 (for engine speed, accelerator pedal position, etc.), a transmission control unit 752 (for PRNDL status and gear shifting), a safety control unit 754 (for safety features such as anti-lock braking, traction control, and air bags), a security control unit 756 (for a vehicle alarm system), a diagnostics unit 758 (to detect an error or malfunctioning feature, control, or sensor), a navigation unit 768 (e.g., a GPS), an instrument panel control unit 760 (for the display of instantaneous vehicle speed, fuel level information, headlight status, and/or other status or warning indicators), a steering wheel control unit 762 (for wiper control, cruise control, and/or other steering-wheel mounted controls), a climate control unit 764 (heating and air conditioning), a entertainment control unit 766 (radio, movies, Internet access, etc.), an environment control unit 770 (seat adjustments, lighting, door locks, sunroof, etc.), and a vehicle computer 772. Each of the nodes monitors the operation of its respective features and functions, and communicates data generated by the sensors 106 to the vehicle computer 772 and/or to other nodes of the network 108. The vehicle computer 772 and/or the individual nodes may contain gateway logic that enables such data to be exposed to external entities, such as the vehicle personal assistant 112.

The vehicle computer 772 may use the sensor data to generate calculated or derived values, such as vehicle speed, acceleration, total miles driven, distance to empty fuel tank, etc. The data made available by the vehicle network 108 to the computing system 100 and thus, the vehicle personal assistant 112, may therefore include raw sensor data, calculated values, and status or diagnostic signals or messages generated by the sensors 106 and/or any of the various nodes of the vehicle network 108.

Other network interfaces 742 may communicatively couple the computing system 100 to other networks 744. Such other networks may include a local area network, wide area network, personal cloud, enterprise cloud, public cloud, and/or the Internet, for example. Accordingly, the network interfaces 742 may include a wired or wireless Ethernet, mobile/cell network, WI-FI, BLUETOOTH, VPN (Virtual Private Network), or NFC (Near Field Communication) device or adapter as may be needed, pursuant to the specifications and/or design of the particular network 744.

The other computing device(s) 746 may be embodied as any suitable type of computing device such as, for example, a server, an enterprise computer system, a network of computers, a combination of computers and other electronic devices, a mobile device, any of the aforementioned types of electronic devices, or other electronic devices. For example, in some embodiments, the other computing devices 746 may be server computers used to store portions of the vehicle-related search realm 142. As another example, one or more of the other computing devices 746 may be associated with the manufacturer of the vehicle 104 and as such, communicate periodically with the vehicle personal assistant 112 to receive information about the user's experience with the vehicle 104 or the vehicle personal assistant 112. As yet another example, one or more of the other computing devices 746 may be the user's personal computing device, such as a smart phone or tablet computer, which may configured to operate portions of the vehicle personal assistant 112 or to exchange data therewith.

The computing environment 700 may include other components, sub-components, and devices not illustrated in FIG. 7 for clarity of the description. In general, the components of the computing environment 700 are communicatively coupled as shown in FIG. 7 by signal paths, which may be embodied as any type of wired or wireless signal paths capable of facilitating communication between the respective devices and components.

Example Usage Scenarios

The vehicle personal assistant 112 can be used in a number of different ways, some example scenarios of which are discussed below for illustrative purposes. Referring now to FIG. 8, the vehicle personal assistant 112 may use real-time vehicle-related inputs 110 and/or non-verbal user inputs 102 to resolve potentially ambiguous spoken language input 102. In FIG. 8, a person 800 is situated in the driver's seat of the illustrative vehicle 104. Some features of the exemplary vehicle personal assistant 112 shown in FIG. 8 are incorporated into existing components of the vehicle 104, although this need not be the case. For example, speakers 820, a display screen 824 and a push-button actuator 830 are installed in a vehicle dashboard 810, a mobile device syncing/docking area 834 (which may include a hard-wired communication port) is defined in a center console 812, and a microphone 826 and push-button actuator 828 are mounted to a steering wheel 814.

To turn the visual display portion 822 of the illustrative vehicle personal assistant 112 on or off, the driver 800 may press the actuator 830. Here, the illustrative display portion 822 is a touch screen graphical user interface by which the driver 800 can attend to messages generated by the vehicle personal assistant 112. In some instances, the driver 800 may wish to turn off the display portion 822 while he or she is driving, for example. In some embodiments, the vehicle personal assistant 112 may be configured to turn off the display portion 822 automatically when the vehicle 104 is shifted into a forward gear.

To initiate the conversational spoken language features of the exemplary vehicle personal assistant 112, the driver 800 can speak a keyword or phrase (such as, "Hello, VPA") or press the button 828. FIG. 8 shows the driver 800 engaging in a spoken language dialog with the exemplary vehicle personal assistant 112. First, the driver speaks a "context-aware" question 836. The vehicle personal assistant 112 responds in a similar conversational spoken language fashion, with a request for clarification 838. The clarification 838 is intelligently informed by the vehicle-related real-time inputs 110.

That is, the context analyzer 126 determines from the inputs 110 that one of the lights on the vehicle indicator panel 816 is currently turned on.

The clarification is also intelligently informed by non-verbal user-generated inputs 102. An in-vehicle camera (not shown) observes the location and direction of the driver 800's pointing finger, and the input monitor 128 receives these non-verbal inputs 102. Based on these non-verbal inputs 102 and the current vehicle inputs 110, the reasoner 136 identifies an indicator light that it believes the user is most probably talking about, 818. Having received confirmation of this, 840, from the driver 800, the query generation and information retrieval engine 138 searches for and retrieves information relating to the indicator 818 in the vehicle-specific user's guide knowledge base 140, and provides that information to the driver 800 in conversational form, 842.

FIG. 8 also shows a personal mobile device 832 positioned in the docking area 834. By doing so, the mobile device 832 can be synchronized with the vehicle personal assistant 112 using a wireless method (e.g., BLUETOOTH or NFC) or wired connection (e.g., Universal Serial Bus connection). In this way, features of the mobile device 832, such as particular software applications or even sensors that are built-in to the mobile device 832 (such as microphones, cameras, accelerometers, proximity sensors, etc.) may communicate data to the vehicle personal assistant 112. Likewise, the vehicle personal assistant 112 may communicate data or instructions to the mobile device 832. As mentioned above, in some embodiments, the vehicle personal assistant 112 may be embodied in the mobile device 832 (e.g., as a mobile device software application), and link with the vehicle network 108 to obtain some or all of the real-time vehicle-related inputs 110 and/or utilize built-in I/O devices of the vehicle 104 (e.g., display screen 824, speakers 820, etc.), when the mobile device 832 is located in or in proximity to the vehicle 104 (through either a wired or wireless connection, as mentioned above).

In other similar examples, the vehicle personal assistant 112 may be implemented primarily as conversational dialog-based digital owner's manual. As such the user may initiate a dialog by asking a question about the vehicle 104 via spoken language input and receive an answer from the vehicle personal assistant 112. The vehicle personal assistant 112 may provide answers to the questions such as: "What size wiper blades does this car take?" "How do I know when to replace the tires?" "What does the red light on the upper right side of the dash mean?" and "Why is it blinking?" (referring to the red light). In response to each of these questions, the vehicle personal assistant 112 may provide a suitable response by consulting the vehicle-specific user's guide knowledge base 140 as well as the vehicle context model 116. The response may be presented using a combination of speech, text, diagram, and/or video output, depending on the vehicle context and/or other circumstances. In some embodiments, the user may ask follow-up questions using speech or speech plus touch screen controls, for example. Additionally, if the user inquiry is unclear and the intent cannot be deduced (e.g., via probabilistic methods), the vehicle personal assistant 112 may request clarification from the user or seek clarification on its own through the use of the real-time vehicle-related inputs 110.

In another example, the vehicle personal assistant 112 may operate in a more autonomous manner. For example, the parents of a teenage boy may configure the vehicle personal assistant 112 to issue a vocal reminder to slow down each time the vehicle speed exceeds the posted speed limit (as determined, for example, by cross-referencing a GPS location with a speed limit directory). The vehicle personal assistant 112 may also be configured to disable or otherwise limit entertainment options within the vehicle 104 while the vehicle 104 is in motion, to encourage the young driver to keep his eyes on the road, for example. In the same vein, the vehicle personal assistant 112 may track the driver's eye movements using an in-vehicle camera and output an alert if the driver's eyes appear to be distracted from the road ahead for longer than a specified time period. In some embodiments, the vehicle personal assistant 112 may be programmed to issue an electronic communication (e.g., via email, text message, a communicatively coupled smart phone, or a vehicle-based phone) to a person or location outside the vehicle 104 if a pre-specified condition is met.

In yet another example, the vehicle personal assistant 112 may be configured to monitor the current context for and respond to user-specified commands or conditions. For instance, a user may issue a conditional instruction to the vehicle personal assistant 112 to "look for cheap gas when the tank gets below halfway." When the condition is met (i.e., gas tank half full), the vehicle personal assistant 112 initiates a search for nearby gas stations using a relevant website or software application, such as GASBUDDY.COM, and displays a list of the lowest-priced gas stations in the area. As another example, a busy working mom may request the vehicle personal assistant 112 to "look for pizza places with deal coupons within a few miles of my daughter's high school after her game this Tuesday" or "be on the lookout for good deals on tennis balls before next weekend." In each of these scenarios, the vehicle personal assistant 112 may classify the input 102 as a conditional instruction and process it as discussed above. For example, in identifying a good deal on tennis balls, the vehicle personal assistant 112 may determine an average cost for tennis balls in the immediate geographical region, periodically search for tennis ball prices as the vehicle 104 comes within geographic range of sports stores, and present a notification when the condition is met.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

In the drawings, specific arrangements or orderings of schematic elements may be shown for ease of description. However, the specific ordering or arrangement of such elements is not meant to imply that a particular order or sequence of processing, or separation of processes, is required in all embodiments.

In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected. Further, while aspects of the present disclosure may be described in the context of passenger cars, it should be understood that the various aspects are applicable to other types of transport vehicles, including any form of passenger or commercial vehicle (e.g., motorcycles, trucks, buses, vans, power boats, snowmobiles, and the like).

The invention claimed is:

1. A vehicle personal assistant embodied in one or more non-transitory machine readable storage media, the vehicle personal assistant executable by a computing system to:
   receive a plurality of different vehicle-related real-time sensor inputs indicative of a current state of a vehicle;
   use one or more of the vehicle-related real-time sensor inputs to determine a current context of human activity in relation to the vehicle;
   in a dialog involving a person and the vehicle personal assistant, receive a human-generated spoken natural language phrase comprising a plurality of words;
   execute a semantic interpretation process on the human-generated spoken natural language phrase to derive, from the plurality of words, a trigger condition, a search action, and a search parameter to be used in executing the search action if the trigger condition is met;
   use a first vehicle-related real-time sensor input to determine if the trigger condition is met;
   determine a second vehicle-related real-time sensor input in response to the trigger condition being met;
   with the second real-time sensor input and the search parameter derived from the human-generated spoken natural language phrase, execute the search action; and
   determine a style of presentation of output of the executing of the search action based on the current context.

2. The vehicle personal assistant of claim 1, executable by a computing system to determine the current context by comparing the real-time sensor inputs to a vehicle-specific knowledge base.

3. The vehicle personal assistant of claim 1, wherein the real-time sensor inputs comprise one or more of accelerating, braking and steering inputs.

4. The vehicle personal assistant of claim 3, executable by a computing system to determine the current context by comparing the real-time sensor inputs to a stored template.

5. The vehicle personal assistant of claim 4, executable by a computing system to compare the current context to a stored template and, based on the comparison, determine an aspect of driving behavior.

6. The vehicle personal assistant of claim 5, executable by a computing system to determine the output based on the aspect of driving behavior.

7. The vehicle personal assistant of claim 5, executable by a computing system to determine the presentation style of the output based on the aspect of driving behavior.

8. The vehicle personal assistant of claim 7, executable by a computing system to determine the presentation style by comparing the real-time sensor inputs to a stored rule corresponding to the aspect of driving behavior.

9. The vehicle personal assistant of claim 1, wherein determining the style of the presentation of output comprises selecting one or more of conversational spoken natural language, text, and recorded media.

10. The vehicle personal assistant of claim 1, executable by the computing system to present the output using the style of presentation.

11. A vehicle personal assistant embodied in one or more non-transitory machine readable storage media, the vehicle personal assistant executable by a computing system to:
    monitor a plurality of real-time sensor inputs relating to the vehicle;
    in a dialog involving natural language speech supplied by a person and natural language output by the vehicle personal assistant, receive a human-generated spoken natural language phrase comprising a plurality of words;
    execute a semantic interpretation process on the human-generated spoken natural language phrase to derive, from the plurality of words, a vehicle-related trigger condition, a search action, and a search parameter to be used in executing the search action if the trigger condition is met, the trigger condition comprising a data value;
    store the data value in computer memory;
    compare a real-time vehicle-related sensor input to the stored data value to determine whether the vehicle-related trigger condition has occurred; and
    in response to determining that the vehicle-related trigger condition has occurred, execute the search action using (i) a different real-time sensor input than the real-time sensor input used to determine whether the vehicle-related trigger condition has occurred and (ii) the search parameter derived from the human-generated spoken natural language phrase; and
    present system-generated output resulting from the executing of the search action.

12. The vehicle personal assistant of claim 11, executable by the computing system to present machine-generated spoken natural language output at a speaker of the vehicle in response to determining that the vehicle-related condition has occurred.

13. The vehicle personal assistant of claim 11, executable by the computing system to display one or more of text, images, graphics, and video on a display of the computing system in response to determining that the vehicle-related condition has occurred.

14. The vehicle personal assistant of claim 11, executable by the computing system to present a suggested action to be performed by the person in relation to the vehicle in response to determining that the vehicle-related condition has occurred.

15. The vehicle personal assistant of claim 11, executable by the computing system to communicate data relating to the vehicle-related condition to another computing system in response to determining that the vehicle-related condition has occurred.

16. The vehicle personal assistant of claim 11, executable by the computing system to receive the real-time sensor inputs from a vehicle network of the vehicle.

17. The vehicle personal assistant of claim 11, wherein the stored data comprises a value associated with the occurrence of the vehicle-related condition, and the vehicle personal assistant is executable by the computing system to compare the real-time sensor inputs to the value.

18. The vehicle personal assistant of claim 11, wherein the stored data relates to a user-specified driving situation associated with the occurrence of the vehicle-related condition, and the vehicle personal assistant is executable by the computing system to compare the real-time sensor inputs to the user-specified driving situation.

19. The vehicle personal assistant of claim 11, executable by the computing system to receive human-generated input in response to the system-generated output and present further system-generated output relating to the conversation in response to the human-generated input.

20. The vehicle personal assistant of claim 11, executable by the computing system to receive human-generated input in response to the system-generated output and continue the conversation based on the human-generated input.

21. The vehicle personal assistant of claim 11, executable by the computing system to monitor the real-time sensor inputs and compare the real-time sensor inputs to the stored data while the vehicle is turned on.

22. The vehicle personal assistant of claim 11, executable by the computing system to access one or more third-party data sources to determine whether the real-time sensor inputs indicate that the vehicle-related condition has occurred.

23. A vehicle personal assistant embodied in one or more non-transitory machine readable storage media, the vehicle personal assistant executable by a computing system to:
    receive a human-generated spoken natural language phrase;
    execute a semantic interpretation process on the human-generated spoken natural language phrase to derive, from the human-generated spoken natural language phrase, a trigger condition, a search action, and a search parameter to be used in executing the search action if the trigger condition is met, the trigger condition comprising a data value;
    monitor one or more vehicle-related real-time sensor inputs;
    compare a first vehicle-related real-time sensor input to the data value to determine whether the vehicle-related trigger condition has occurred; and
    in response to determining that the trigger condition has occurred:
    determine a current value of a second real-time input associated with the occurrence of the trigger condition; and
    execute the search action using (i) the current value of the second real-time input and (ii) the search parameter derived from the human-generated spoken natural language phrase.

24. The vehicle personal assistant of claim 23, executable by the computing system to apply a vehicle-specific knowledge base to the human-generated input to interpret the vehicle-related triggering condition.

25. The vehicle personal assistant of claim 23, executable by the computing system to determine a current context based on the vehicle-related real-time sensor inputs and, in response to determining that the vehicle-related condition has occurred, present a system-generated output using a presentation style based on the current context.

26. The vehicle personal assistant of claim 25, executable by the computing system to determine the current context by comparing the vehicle-related real-time sensor inputs to a stored template.

27. The vehicle personal assistant of claim 23, executable by the computing system to compare the vehicle-related real-time sensor inputs to the vehicle-related condition while the vehicle is in operation.

28. The vehicle personal assistant of claim 23, executable by the computing system to receive the vehicle-related real-time sensor inputs from a vehicle network of the vehicle.

29. The vehicle personal assistant of claim 23, executable by the computing system to, in response to determining that the vehicle-related triggering condition has occurred, present machine-generated conversational spoken language output relating to the vehicle-related triggering condition.

30. The vehicle personal assistant of claim 25, executable by the computing system to receive further human-generated input in response to the system-generated output and determine whether to modify the vehicle-related triggering condition based on the further human-generated input.

31. The vehicle personal assistant of claim 30, wherein the further human-generated input comprises one or more of conversational spoken language input and non-verbal input.

32. The vehicle personal assistant of claim 23, executable by the computing system to present further system-generated output in response to the further human-generated input.

\* \* \* \* \*